(12) United States Patent
Dechant et al.

(10) Patent No.: US 11,122,746 B2
(45) Date of Patent: *Sep. 21, 2021

(54) GEARED HAND TOOL

(71) Applicant: Fiskars Finland Oy Ab, Helsinki (FI)

(72) Inventors: Stephen P. Dechant, Lodi, WI (US); Steven Stokes, Fitchburg, WI (US)

(73) Assignee: Fiskars Finland Oy Ab, Helsinki (FI)

( * ) Notice: Subject to any disclaimer, the term of this patent is extended or adjusted under 35 U.S.C. 154(b) by 78 days.

This patent is subject to a terminal disclaimer.

(21) Appl. No.: 16/197,620

(22) Filed: Nov. 21, 2018

(65) Prior Publication Data

US 2019/0082607 A1  Mar. 21, 2019

Related U.S. Application Data

(63) Continuation of application No. 15/161,862, filed on May 23, 2016, now Pat. No. 10,136,583.

(51) Int. Cl.
*A01G 3/02* (2006.01)
*A01G 3/025* (2006.01)
(Continued)

(52) U.S. Cl.
CPC ............. *A01G 3/021* (2013.01); *A01G 3/02* (2013.01); *A01G 3/0251* (2013.01); *B23D 29/02* (2013.01);
(Continued)

(58) Field of Classification Search
CPC ...... A01G 3/02; A01G 3/0475; A01G 3/0251; A01G 3/021; B26B 13/285; B26B 13/26; B26B 13/06; B23D 29/02
(Continued)

(56) References Cited

U.S. PATENT DOCUMENTS 2,223,306 A   11/1940   Mead
2,647,312 A    8/1953   Neal
(Continued)

FOREIGN PATENT DOCUMENTS

DE            19742915 A1    4/1999
DE     10 2006 060 420       6/2008
(Continued)

OTHER PUBLICATIONS

International Search Report and Written Opinion, PCT/US2017/026670, Fiskars Brands, Inc., 12 pages (dated Jun. 23, 2017).
(Continued)

*Primary Examiner* — Ghassem Alie
(74) *Attorney, Agent, or Firm* — Foley & Lardner LLP

(57) ABSTRACT

A hand tool includes a first jaw; a second jaw rotatably coupled to the first jaw, the second jaw including a first set of projections and a first bearing surface, the first bearing surface having a first curvature; and a lever coupled to the first jaw, the lever including a second set of projections and a second bearing surface, the second bearing surface having a second curvature. During a movement of the first and second jaws from a full open position to a full close position, the first and second sets of projections are at least partially engaged to prevent a slippage between the first and second bearing surfaces that are in a rolling contact during the movement of the first and second jaws from the full open position to the full close position.

9 Claims, 10 Drawing Sheets

(51) Int. Cl.
*B26B 13/28* (2006.01)
*B23D 29/02* (2006.01)
*B26B 13/06* (2006.01)

(52) U.S. Cl.
CPC ............ *B23D 29/026* (2013.01); *B26B 13/06* (2013.01); *B26B 13/285* (2013.01)

(58) Field of Classification Search
USPC .................. 30/250, 276, 249, 254, 194, 252
See application file for complete search history.

(56) References Cited

U.S. PATENT DOCUMENTS

| | | | |
|---|---|---|---|
| 2,816,359 A * | 12/1957 | Hogue | A01G 3/02 30/239 |
| 2,926,556 A | 3/1960 | Dupre | |
| 3,579,828 A | 5/1971 | Hexdall | |
| 4,050,153 A | 9/1977 | Flisch | |
| 5,689,888 A | 11/1997 | Linden | |
| 6,938,346 B1 | 9/2005 | Huang | |
| 8,584,368 B2 * | 11/2013 | Huang | B26B 13/26 30/252 |
| 2008/0282549 A1 | 11/2008 | Lin | |
| 2010/0269357 A1 * | 10/2010 | Shan | A01G 3/0251 30/254 |
| 2011/0126415 A1 * | 6/2011 | Huang | A01G 3/0475 30/254 |
| 2011/0214293 A1 | 9/2011 | Huang | |
| 2012/0060377 A1 * | 3/2012 | Huang | A01G 3/0251 30/244 |
| 2012/0096994 A1 | 4/2012 | Poole et al. | |
| 2015/0135914 A1 | 5/2015 | Cunningham | |
| 2016/0113208 A1 * | 4/2016 | Hsu | A01G 3/021 30/251 |
| 2016/0345506 A1 * | 12/2016 | Lin | A01G 3/021 |

FOREIGN PATENT DOCUMENTS

| | | |
|---|---|---|
| DE | 20 2011 109 430 U1 | 1/2012 |
| EP | 2 796 035 A1 | 10/2014 |
| FR | 41940 E | 5/1933 |

OTHER PUBLICATIONS

English Translation of Chinese Office Action Received for Chinese Application No. 201780030861.6, dated Oct. 10, 2020, 11 pages.

* cited by examiner

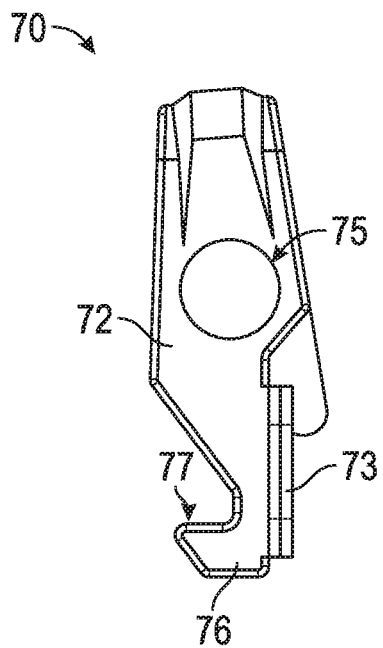
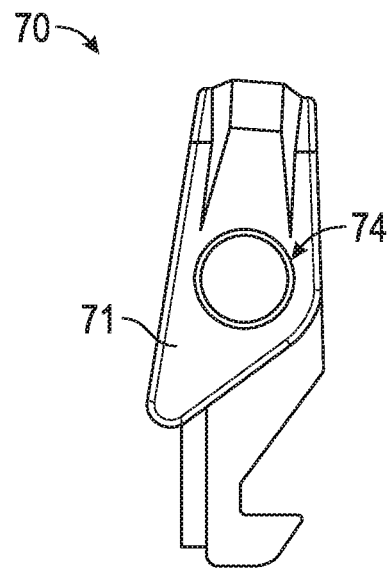
FIG. 7A    FIG. 7B
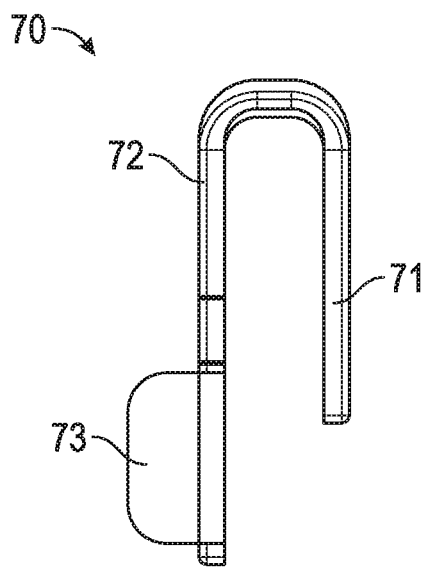
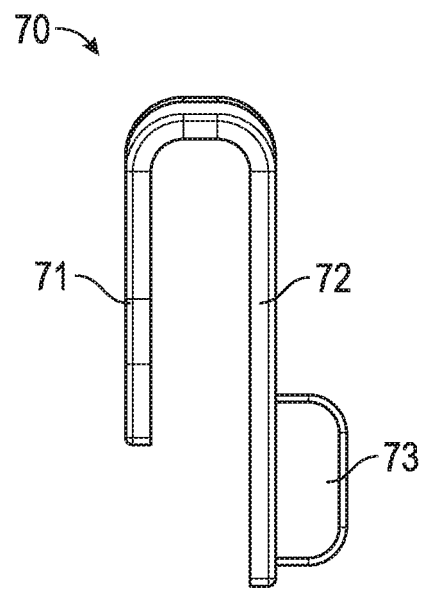
FIG. 7C    FIG. 7D

GEARED HAND TOOL

CROSS-REFERENCE TO RELATED APPLICATION

This Application claims the benefit of priority as a continuation of U.S. patent application Ser. No. 15/161,862, entitled "GEARED HAND TOOL," filed on May 23, 2016, which is incorporated herein by reference in its entirety.

FIELD

The present disclosure relates to hand operated tools. More particularly, the present disclosure relates to geared hand operated tools.

BACKGROUND

This section is intended to provide a background or context to the disclosure recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Hand operated tools can take a variety of forms including hand operated striking tools (e.g., a hammer) to hand operated cutting tools (e.g., a scissors). Within the general category of hand operated cutting tools, one-hand operated and two-hand operated cutting tools exist. Examples of one-hand operated cutting tools include scissors, shears, pruners, and snips. An example of a two-hand operated cutting tool includes a lopper.

One-hand operated cutting tools can be difficult to use. In particular, when the handles of the one-hand operated cutting tool are maximally spaced, the user's hand using the one-hand operated cutting tool is also in a spread position (i.e., where the user's fingers are in an outward and extending position relative to the palm of the hand as compared to a closed position where the user's fingers are relatively closer to the palm). This spread position corresponds with an inability of the user to deliver a high amount of squeezing force to the handles to close the jaws of the cutting tool and to cut an object (e.g., a piece of paper). As a result, the actual cutting of the object occurs at a relatively smaller handle angle (i.e., the angle between the handles of the hand operated cutting tool). Such a characteristic is undesirable because additional cutting strokes may be needed to finish an intended cut length of the object. Consequently, users may experience fatigue and/or muscle strain in using typical one-hand operated cutting tools.

SUMMARY

One embodiment relates to a one-hand operated tool. The one-hand operated tool includes a first jaw; a second jaw rotatably coupled to the first jaw at a first pivot connection, the second jaw having a first set of projections and a first bearing surface, the first bearing surface having a first curvature; and, a lever rotatably coupled to the first jaw at a second pivot connection, the lever including a second set of projections and a second bearing surface, the second bearing surface having a second curvature. According to one embodiment, the first and second jaws are movable between a full open position and a full close position and during movement of the first and second jaws from the full open position to the full close position, the first and second sets of projections are at least partially engaged and the first and second bearing surfaces are in rolling contact. According to one embodiment, the first curvature may be non-circular shaped and the second curvature may be non-circular shaped to match the first curvature. According to one embodiment, the mechanical advantage may be at a maximum amount at or near the full open position and a minimum amount at or near the full close position, wherein the mechanical advantage may be based on the rolling contact of the first bearing surface to the second bearing surface.

Another embodiment relates to a hand tool. The hand tool includes a first jaw; a first handle coupled to a second jaw, the second jaw pivotably coupled to the first jaw and having a first geared structure, the first geared structure including a first plurality of teeth and a first bearing surface; and, a second handle coupled to a lever, the lever pivotably coupled to the first jaw and including a second geared structure, the second geared structure including a second plurality of teeth and a second bearing surface. According to one embodiment, the first and second handles are movable between a full open position and a full close position, and wherein during movement from the full open position to the full close position, the first plurality of teeth are at least partially engaged with the second plurality of teeth and the first and second bearing surfaces are in rolling contact. In one embodiment, the rolling contact between the first and second bearing surfaces defines a variable mechanical advantage profile of the hand tool.

Still another embodiment relates to a hand tool. The hand tool includes a first jaw including a first functional member, the first jaw defining a first aperture and a second aperture; a second jaw rotatably coupled to the first jaw at the first aperture, the second jaw including a second functional member and a first geared structure, the first geared structure including a first set of projections and a first bearing surface having a first curvature; and, a lever coupled to the first jaw at the second aperture, the lever having a second geared structure, the second geared having a second set of projections and a second bearing surface having a second curvature. According to one embodiment, the first jaw and second jaw are rotatable between a full open position and a full close position, wherein the first and second sets of projections are at least partially engaged during rotation from the full open position to the full close position while the first and second bearing surfaces are in rolling contact from the full open position to the full close position.

BRIEF DESCRIPTION OF THE DRAWINGS

FIGS. 7A-7D are front (FIG. 7A), rear (FIG. 7B), right (FIG. 7C), and left (FIG. 7D) side views of a lock lever for the one-hand operated cutting tool of FIGS. 1-2, according to exemplary embodiments.

DETAILED DESCRIPTION

Figure 1:
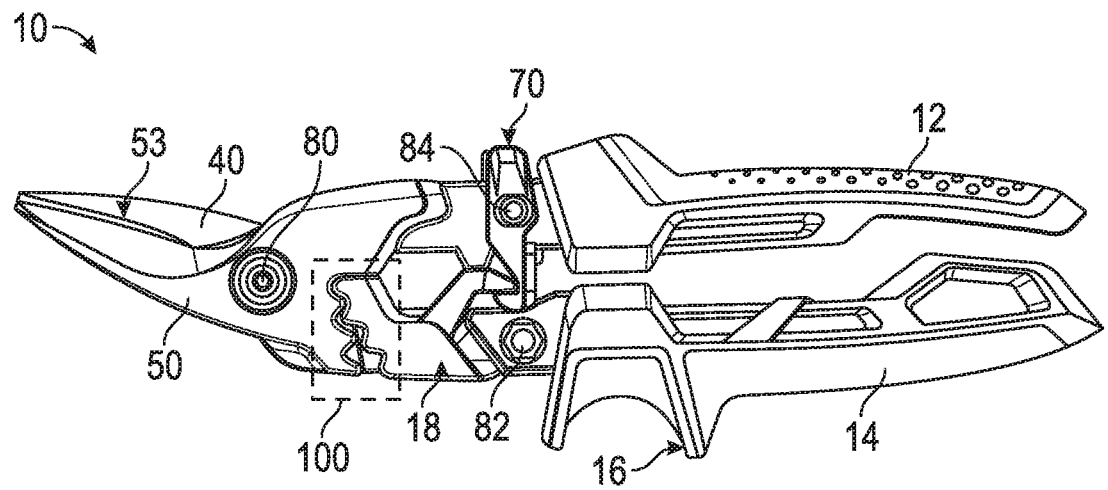
FIG. 1 is a front longitudinal view of a one-hand operated cutting tool, such as a snip, in a fully closed and locked position, according to an exemplary embodiment.

Referring to the Figures generally, hand-operated cutting tools with a variable mechanical advantage system are provided according to various embodiments herein. As described more fully herein, the variable mechanical advantage system may be structured to increase the force provided by the hand-operated cutting tool in the full or mostly full open position (i.e., where the handles are at a maximum or substantially maximum separation distance) to increase the cutting force provided by the tool over an extended cut length relative to conventional hand-operated cutting tools. Beneficially and as a result, a user may experience an increase in productivity due to the extended cut lengths than typical hand-operated cutting tools, which may result in an improved ease of use, relatively less muscle/hand fatigue, and an overall more pleasant experience with the hand-operated cutting tool(s) of the present disclosure.

According to the present disclosure, a one-hand operated cutting tool includes a lever, a first jaw having a first cutting member (e.g., a blade), a second jaw having a second cutting member (e.g., another blade), and a pair of opposing handles. The second jaw may include a first geared structure having a first set of projections (e.g., gears, meshable teeth, etc.) and a first bearing surface (e.g., cam surface), where the first bearing surface extends beyond a tip of a furthest extending projection in the first set of projections. The lever may include a second geared structure having a second set of projections (e.g., gears, meshable teeth, etc.) and a second bearing surface (e.g., cam surface), where the second set of projections extend at least partially beyond a tip of the second bearing surface. In use, as the pair of handles are moved from the full open position to the full close position, the first and second cutting members pivot about a pivot connection to provide a cutting force to an object of the tool. In combination with this pivot action and due at least partly to the first bearing surface extending beyond a tip of the furthest extending projection in the first set of projections, the first and second bearing surfaces engage in a rolling manner to carry or transmit all or a majority of the load or force generated from the opposing handles as the opposing handles are actuated toward the full close position in order to actuate the first and second jaws to cut the object. Further and in conjunction with the rolling contact and pivoting, the first and second sets of projections at least partially engage to prevent or substantially prevent the first and second bearing surfaces from slipping, such that the force provided by the user (from actuation of the handles toward the full close position) is completely or mostly completely captured to actuate the first and second jaws to cut an object. As such, the one-hand operated cutting tool utilizes a pivot connection, a rolling engagement, and an engagement of the projections to deliver the cutting force to the object. While typical hand operated cutting tools utilize only a pivot connection to cut an object, Applicant has determined that the use of these three mechanisms may provide a variable mechanical advantage that reduces fatigue from use of the tool, and increases the cutting force provided at the full or nearly full open position to increase the cut length of the hand-operated cutting tool of the present disclosure relative conventional hand-operated cutting tools.

According to the present disclosure, the first and second bearing surfaces define curved surfaces that provide the rolling engagement. When the handles are at a full open position where the user's available hand force is at a minimum, the mechanical advantage provided by the rolling contact of the first to second bearing surfaces relative to a pivot connection for the first and second jaws is at a maximum amount. As the user actuates the handles to the full closed position, the rolling engagement contact point rolls relatively closer to the pivot connection to thereby reduce the provided/available mechanical advantage. However, as the handles are actuated to a full close position, the available force from the user increases (i.e., when the user's fingers move closer to their palm, the user is capable of providing relatively more squeezing force). Accordingly, the variable mechanical advantage system disclosed and described herein provides an increase in mechanical advantage to the user when the one-hand operated cutting tool is at or near a full open position and decreases to minimum when the one-hand operated cutting tool is at or near a full close position. As such, the variable mechanical advantage system of the present disclosure may be tailored to, coincide with, or otherwise match the hand strength characteristics for a user (i.e., at a minimum at a full open position and at a maximum at a full close or fist position).

Moreover, Applicant has determined that the first and second sets of gears may be useful in hand tools because the sets of gears may be designed to have shifting ratios through the tool's range of motion in order to prevent or substantially prevent slippage of the first and second bearing surfaces during movement from the full open to full close position and vice versa. These shifts in ratio may be aligned with the user's available hand force through the range of motion to make the tool easier or relatively easier to use. However and conventionally, gears have limited application in hand tools because often the operating angles of the handles are small, and the force requirements are relatively high. To achieve pronounced changes in gear ratios over the course of the movement, fine teeth are required, but fine teeth are typically weak. As such and beneficially, the rolling contact surfaces (i.e., the first and second bearing surfaces) are structured to take, carry, or transmit the majority of the load, such that the first and second sets of gears substantially only need to prevent slipping of the rolling engagement between the first and second bearing surfaces. Thus, Applicant has determined that a wider configurability of the gears may be possible using the variable mechanical advantage system of the present disclosure. As such, a relatively smooth motion with pronounced changes in gear ratio over any or substantially any handle operating angle, even relatively small angles, may be provided by the hand-operated tool of the present disclosure. These and other benefits and advantages are described more fully herein.

As used herein, a "one-hand operated cutting tool" refers to a cutting tool that is intended to be operated by only one-hand of a user. A non-exhaustive list of one-hand operated cutting tools includes snips, pruners, shears, scissors, etc. In comparison and as used herein, a "two-hand operated cutting tool" refers to a cutting tool that is intended to be operated using both hands of a user. A non-exhaustive list of two-hand operated cutting tools includes loppers, bolt cutters, and the like. In this regard and while various features of the disclosure are shown and described primarily herein with reference to a one-hand operated cutting tool, such illustration is not meant to be limiting. In this regard, the present disclosure contemplates that the variable mechanical advantage system may be used with a wide variety of cutting devices including two-hand operated cutting tools.

As also used herein, the "cutting stroke" refers to movement of the handles from a "full open" start position to a "full close" end position. In the "full open" position, the handles are separable by a maximum distance and angle, and the cutting members are separable by a maximum distance and angle. In comparison, in the "full close" position, the handles are separated by a minimum distance and angle, and the cutting members are separated by a minimum distance and angle. In particular, in the full close position, the cutting members may be in at least partial contact with each other. Conversely, the "opening stroke" refers to a full closed start position progressing to a full open end position.

As also used herein, the term "cut length" refers to the actual length of cut effectuated by the cutting tool during one cutting stroke. In this regard, "actual" refers to a measurement taken from the perspective of the object of the cutting tool: from the start of the cut or incision to an end of the cut in the object is the "cut length." For example, a scissors may provide a three (3) inch length of cut per cutting stroke despite have cutting members (i.e., blades) that are greater than four (4) inches in length.

Figure 2:
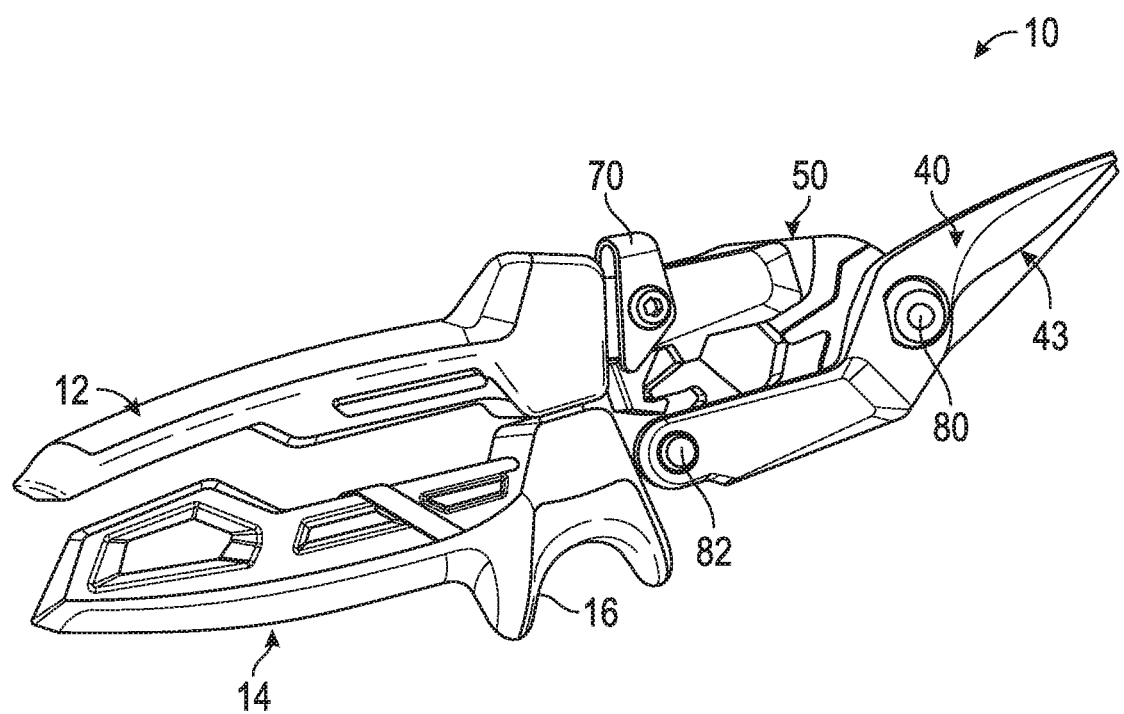
FIG. 2 is a rear perspective view of the one-hand operated cutting tool of FIG. 1, according to an exemplary embodiment.

Referring now to FIGS. 1-2, front (FIG. 1) and rear (FIG. 2) longitudinal views of a one-hand operated cutting tool are shown, according to an exemplary embodiment. In FIGS. 1-11, the one-hand operated cutting tool is shown as a snip 10. However, as mentioned above, this depiction is for illustrative purposes only as the concepts of the present disclosure may be implemented in a variety of one-hand and two-hand operated cutting tools, with all such variations intended to fall within the scope of the present disclosure.

Among various other components, the snip 10 is shown generally to include a top handle 12, a bottom handle 14 positioned vertically below the top handle 12, a lever 18, a first jaw 40, a second jaw 50, a lock lever 70, and a variable mechanical advantage system 100. The top handle 12 may be coupled, attached, or otherwise joined to the second jaw 50, while the first jaw 40 is rotatably coupled to the second jaw 50 at a first pivot connection 80 and rotatably coupled to the lever 18 at a second pivot connection 82. As shown, the lock lever 70 is rotatably coupled to the second jaw 50 at a third pivot connection 84, such that the lock lever 70 may be releasably engageable with the lever 18. Accordingly, in use, a user may rotate the lock lever 70 to cause the lock lever 70 to rotate about the third pivot connection 84 to selectively engage and disengage with the lever 18 to permit or prohibit actuation of the handles 12, 14 to perform the cutting stroke.

As shown, the first jaw 40 includes a functional member, shown as a cutting member 43 (i.e., a first cutting member), while the second jaw 50 includes another functional member, shown as a cutting member 53 (i.e., a second cutting member). In the example depicted, the cutting members 43, 53 are structured as blades. The blades cooperate with each other to cut, sever, or otherwise rupture an object during the cutting stroke. Further and in this example, the snip 10 may be structured as an aviation snip, such that the blades are adapted for metal cutting (e.g., tin snips). In this regard and as shown, the cutting members 43, 53 are angled upward and outward from the first pivot connection 80. Such a configuration promotes engagement and cutting of a metal object. However and as described herein, the configuration of the cutting members 43, 53 as blades is not meant to be limiting; in other embodiments, the cutting members 43, 53 may be configured as serrated blades, a blade and anvil configuration, and so on.

As mentioned above, the snip 10 includes a variable mechanical advantage system 100. As shown and described herein, the variable mechanical advantage system 100 may provide a relatively larger cutting force by increasing the mechanical advantage provided at or near a full open position to therefore increase the cut length delivered by the one-hand operated cutting tool per cutting stroke relative to conventional one-hand operated cutting tools. In other words, the variable mechanical advantage system 100 translates relatively little available hand force from the user into a relatively greater mechanical advantage than conventional one-hand operated cutting tools to increase the force provided at the full open position to, in turn, effect a relatively greater cut length than conventional one-hand operated cutting tools. Before turning to operation of the snip 10 with the variable mechanical advantage system 100, the specific components/features of the snip 10 are shown and described herein in regard to FIGS. 3-7D.

Figure 3:
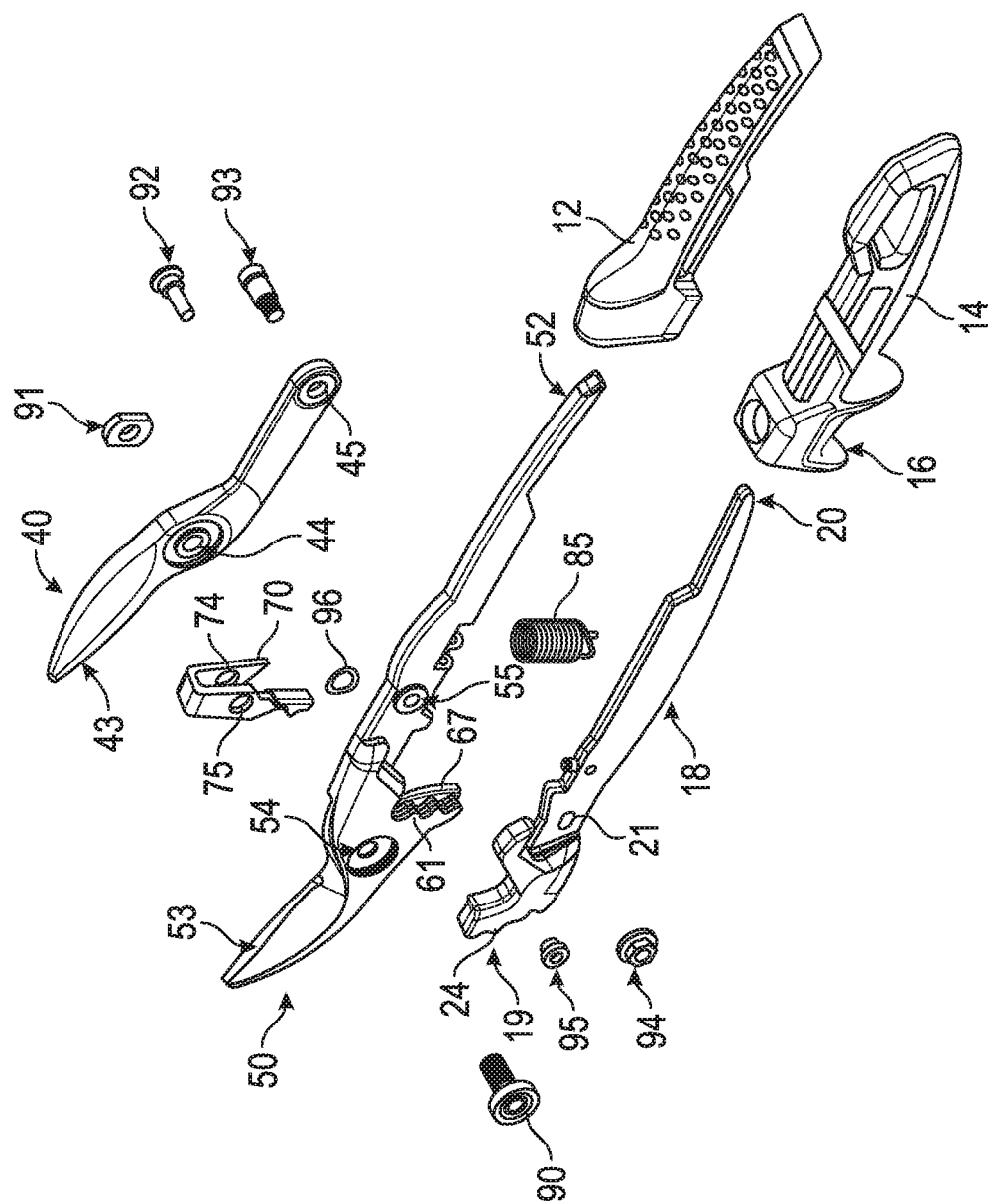
FIG. 3 is an exploded assembly view of the one-hand operated cutting tool of FIGS. 1-2, according to an exemplary embodiment.

Accordingly, referring now to FIG. 3, an exploded assembly view of the snip 10 is shown, according to an exemplary embodiment. In addition to the top handle 12, bottom handle 14, first jaw 40, second jaw 50, and lever 18, the snip 10 is shown to include a plurality of other components including a biasing member, shown as a spring 85, and various other components that form, comprise, or make-up the first, second, and third pivot connections 80, 82, and 84.

In regard to the handles 12, 14, the top handle 12 and bottom handle 14 may be constructed from any suitable material for serving as an interface for a hand of the user (e.g., the fingers, palm, and thumb). Accordingly, the top and bottom handles 12, 14 may be constructed from any one or more of rubber, composite, plastic, and metal. Further, the handles 12 and 14 may have any shape desired. In the example depicted, the bottom handle 14 defines a finger-catch 16 for receiving a finger of the user, such as the pointer finger. Beneficially, the finger-catch 16 may facilitate increased control and leverage to the user by substantially alleviating slippage of the finger on the handle 14. However, in other embodiments, the finger-catch 16 may be excluded from the handle 14, positioned on the top handle 12, and/or positioned on each of the top and bottom handles 12, 14. In still other embodiments, the shape of the finger-catch 16 may differ from that depicted in FIGS. 1-3. For example, in other arrangements, the finger-catch 16 may be rectangular-shaped, have smaller side walls, etc. Accordingly, those of ordinary skill in the art will appreciate that the shape and structure of the handles 12, 14 is highly configurable with all such variations intended to fall within the scope of the present disclosure.

In operation, the top handle 12 may slide over a rear end 52 of the second jaw 50 while the bottom handle 14 slides over a rear end 20 of the lever 18. In this regard, the top handle 12 receives the second jaw 50 while the bottom handle 14 receives the lever 18. In some instances, a bonding agent (e.g., glue, epoxy, etc.) may be utilized to enhance coupling of the top handle 12 to the second jaw 50 and the bottom handle 14 to the lever 18. For example, an epoxy may be applied to the rear end 20 of the lever 18 and the rear end 52 of the second jaw 50, wherein the epoxy is configured to bind to each of the handles 14 and 12, respectively, after insertion/coupling. However, such an arrangement is not meant to be limiting as the present disclosure contemplates any and all joining or coupling mechanisms for the top handle 12 to the second jaw 50 and the bottom handle 14 to the lever 18. Such coupling or joining mechanisms may include, but at are not limited to, an interference fit relationship, a snap engagement (e.g., a protrusion of the lever 18 may "snap" into an opening of the bottom handle 14), use of one or more fasteners (e.g., a rivet, screw, pin, etc.), and the like.

As mentioned above, the first pivot connection 80 may rotatably couple the second jaw 50 to the first jaw 40, the second pivot connection 82 may rotatably couple the lever 18 to the first jaw 40, and the third pivot connection 84 may rotatably couple the lock lever 70 to the second jaw 50. While the pivot connections 80, 82, and 84 may include any type of pivot connection that facilitates rotatable coupling, FIG. 3 depicts an example set of pivot connections 80, 82, and 84 for the snip 10. In this regard, the depicted construction of the pivot connections 80, 82, and 84 is not meant to be limiting. Rather, the present disclosure contemplates that any type of pivot connection may be used for any of the pivot connections 80, 82, and 84 (e.g., pins, etc.).

In the example shown, the first pivot connection 80 is formed by a first aperture 54 (e.g., opening, through-hole, orifice, etc.) defined by the second jaw 50, a first aperture 44 (e.g., opening, through-hole, orifice, etc.) defined by the first jaw 40, a bolt 90, and a nut 91. In operation, the bolt 90 (e.g., screw, fastener, etc.) may be inserted through each of the first apertures 44 and 54, and the nut 91 may threadedly engage with a threaded end of the bolt 90 to fasten the first jaw 40 to the second jaw 50. The bolt 90 and nut 91 may be structured as any type of engageable or corresponding bolt and nut combination. In certain embodiments, either one or more both of the first apertures 44 and 54 may define a plurality of threads for threadedly engaging with the bolt 90. In other embodiments, either one or more both of the first apertures 44 and 54 may be structured as a smooth or substantially smooth bores. In each instance, the first pivot connection 80 facilitates relative rotation or movement between the first jaw 40 and the second jaw 50.

In the example depicted, the second pivot connection 82 is formed from a first aperture 21 (e.g., opening, through-hole, orifice, etc.) defined by the lever 18, a second aperture 45 (e.g., opening, through-hole, orifice, etc.) defined in the first jaw 40, a bolt 93, and a nut 94. In operation, the bolt 93 (e.g., screw, fastener, etc.) is inserted through each of the first aperture 21 and the second aperture 45. Subsequently, the nut 94 is threadedly engaged with the bolt 93 to fasten the first jaw 40 to the lever 18. In certain embodiments, either one or both of the first aperture 21 and second aperture 45 may define a plurality of threads for threadedly engaging with the bolt 93. In other embodiments, either one or both of the first aperture 21 and the second aperture 45 may be structured as a smooth or substantially smooth bores. In each instance, the second pivot connection 82 facilitates relative rotation or movement between the first jaw 40 and the lever 18.

In the example depicted, the third pivot connection 84 is formed from a second aperture 55 (e.g., opening, through-hole, orifice, etc.) defined in the second jaw 50, a bolt 92, a nut 95, a washer 96, and a pair of laterally opposing apertures 74, 75 defined by the lock lever 70. In operation, the lock lever 70 is disposed about the second jaw 50, such that the laterally opposing apertures 74, 75 align or substantially align with the second aperture 55. Subsequently, the bolt 92 (e.g., screw, fastener, etc.) may be inserted through each of the apertures 55, 74, and 75, the washer 96 positioned between the nut 95 and the lock lever 70, and the nut 95 coupled to an end of the bolt 92 to retain the lock lever 70 to the second jaw 50. In one embodiment, the washer 96 may be structured as a spring washer to prevent or substantially prevent uncoupling of the bolt 92 and nut 95 during use of the snip 10. In other embodiments, the washer 96 may be excluded from the third pivot connection 84 (in this arrangement, nylon or another type of de-coupling material/substance may be used with the nut 95 to prevent uncoupling). After assembly, the lock lever 70 may be rotatably coupled to the second jaw 50, such that the lock lever 70 may rotate or move about the bolt 92 to selectively engage with the lever 18 to hold or retain the handles 12, 14 in the full close position.

As mentioned above, the snip 10 also includes a biasing member, shown as a spring 85. The spring 85 may be attached to each of the second jaw 50 and the lever 18. As shown, the spring 85 is attached between the handles 12, 14 and the variable mechanical advantage system 100. The spring 85 may be structured to bias the second jaw 50 away from the lever 18 (or vice versa: the lever 18 away from the second jaw 50) (i.e., towards the full open position). In this regard, when the cutting members 43, 53 are in the full close position, the spring 85 provides an elastic force to the second jaw 50 and the lever 18 to push the cutting members 43, 53 away from each other and towards the full open position. Thus, when the lock lever 70 is engaged with the latch 32 of the lever 18 (see FIGS. 4A-4C) to retain or hold the cutting members 43, 53 in the full close position, the spring 85 is in a compressed state. Upon disengagement of the lock lever 70 from the latch 32, the spring 85 expands to push the lever 18 away from the second jaw 50. Beneficially, the spring 85 acts to support and facilitate the full open position to avoid a user having to physically open the handles 12, 14 to the full open position each time a cutting stroke is actuated. It should be understood that the stiffness of the spring 85 is highly variable and may differ from application-to-application. Further, while the biasing member is shown as a spring, in other embodiments, other biasing members may also be used, such that this illustration is not meant to be limiting.

As shown in FIGS. 1-3, the snip includes a variable mechanical advantage system 100. The variable mechanical advantage system 100 is structured to increase the mechanical advantage (e.g., leverage, force, etc.) provided the cutting members 43, 53 when the handles 12, 14 are in the full or mostly full open position to achieve a relatively longer cut length for each cutting stroke. To achieve such characteristics, the variable mechanical advantage system 100 utilizes the first pivot connection 80 in combination with various features of the lever 18 and second jaw 50. Such features are explained in more detail below in regard to FIGS. 4A-7D and during the cutting stroke explanation accompanied herein with FIGS. 8A-8F.

Figure 4A:
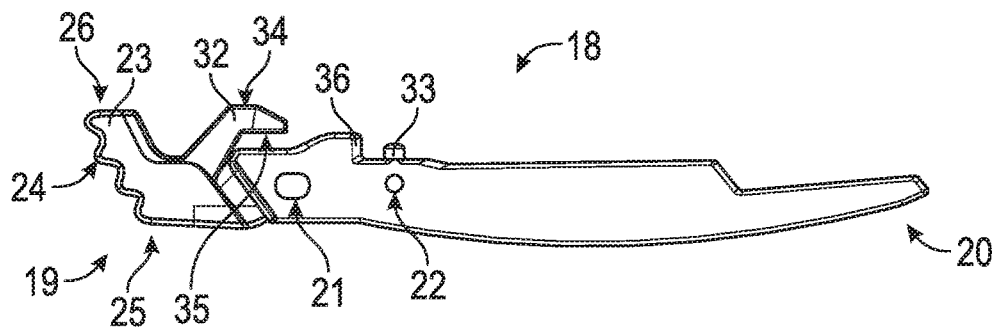
FIGS. 4A-4C are front longitudinal (FIG. 4A), rear longitudinal (FIG. 4B), and close-up (FIGS. 4C) views of the lever of the one-hand operated cutting tool of FIGS. 1-2, according to exemplary embodiments.
Figure 4B:
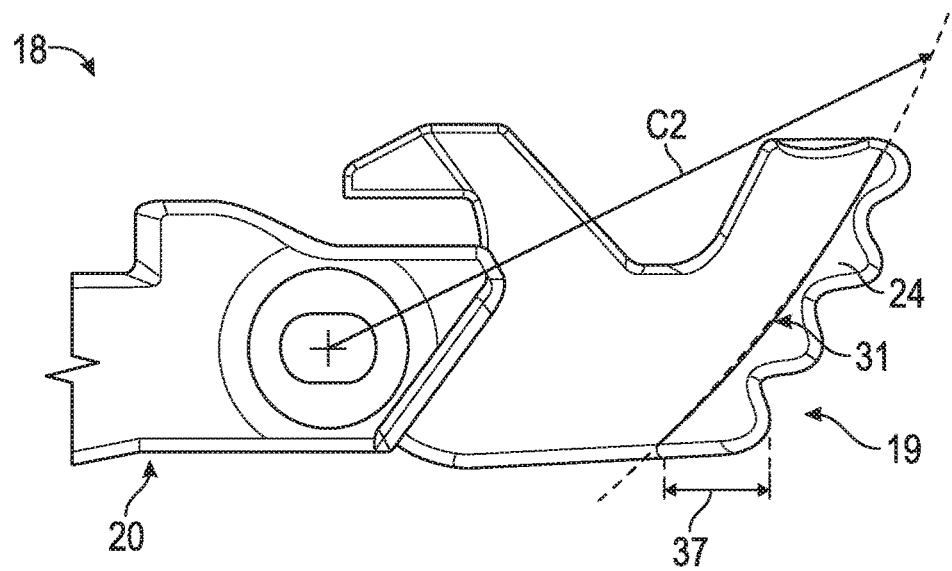
Figure 4C:
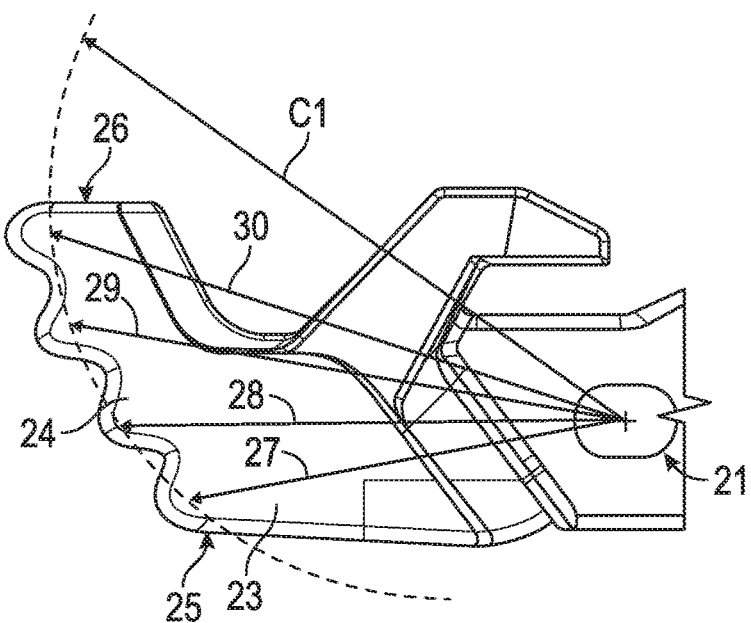

Accordingly, referring collectively now to FIGS. 4A-4C, front longitudinal (FIG. 4A), rear longitudinal (FIG. 4B), and close-up (FIG. 4C) views of the lever 18 are shown, according to exemplary embodiments. As shown, the lever 18 includes a first end 19 associated with the variable mechanical advantage system 100, a second end 20 opposite the first end 19, a first aperture 21 (e.g., opening, hole, orifice, etc.) disposed between the first end 19 and the second end 20, a second aperture 22 (e.g., opening, hole, orifice, etc.), a protrusion 33, and a geared structure 23 having a plurality of gears or teeth 24 and a bearing surface 31 (also referred to as a cam surface 31), and a latch 32. In this regard and as shown, the geared structure 23 forms part of the variable mechanical advantage system 100.

As shown, the lever 18 is structured as a substantially flat structure or body, wherein the geared structure 23 is raised relative to the remaining portion of the lever 18 (i.e., raised, offset, or elevated out-of-the-page in the depiction of FIGS. 4A-4B relative to the remaining portion of the lever 18). Due to this structure, the lever 18 may be formed or constructed from a variety of materials and in a variety of manners. For example and in one embodiment, the lever 18 may be of unitary construction (i.e., all one piece), where the lever 18 may be cast (e.g., die-cast), extruded, molded, formed/machined, etc. In another embodiment and due to the relatively flat structure, the geared structure 23 may be a separate component from the remainder of the lever 18. As such, the lever 18 and geared structure 23 may be joined by any suitable manner (e.g., a bonding agent, a fastener such as a set screw, a combination thereof, etc.) to form a stacked structure. Accordingly, the lever 18 may be constructed from any suitable material, including but not limited to, metal, metal alloys, plastic, composites, and/or any combination thereof. Further and beneficially, such a relatively flat construction facilitates ease of manufacturing of the lever 18 and snip 10 in general.

As shown, the protrusion 33 extends substantially vertical/upward from the lever 18 (i.e., substantially perpendicular to the longitudinal/horizontal orientation of the lever 18 shown in FIGS. 4A-4B) and is disposed between the geared structure 23 and the second end 20. The protrusion 33 (e.g., member, extension, jut, projection, etc.) may be structured to engage with the spring 85. In this regard and as shown in FIG. 3, the spring 85 may be structured as a coil spring that is substantially cylindrical in shape. Therefore, at least some of the coils of the spring 85 may substantially surround the protrusion 33 when the spring 85 is coupled to the lever 18. Accordingly, the protrusion 33 may be structured as any size and shape that enables engagement with the spring 85 (e.g., cylindrical, prism, etc.). In use, the protrusion 33 may prevent or substantially prevent the spring 85 from sliding toward the first and second ends 19, 20 as well as directions into and out-of-the page. In addition to the engagement of the protrusion 33 with the spring 85, the spring 85 may be coupled to the lever 18 via the second aperture 22 and further restricted from sliding based on the ledge 36 (e.g., wall, step, stop, etc.). In this regard, cooperation of the ledge 36 and the protrusion 33 may restrict a sliding movement of the spring 85 while the second aperture 22 couples, joins, or fastens the spring 85 to the lever 18. In this regard and in use, an end of a coil of the spring 85 may be inserted through the second aperture 22 to fasten one end of the spring 85 to the lever 18. Accordingly, the second aperture 22 may have any shape and size (e.g., circular cross-section, rectangular cross-section, etc.) that allows coupling with the spring 85.

As mentioned above, the geared structure 23 forms part of the variable mechanical advantage system 100, and includes a plurality of teeth 24, a bearing surface 31, and a latch 32. The latch 32 extends upward and away from the plurality of teeth 24 (based on the view depicted in FIG. 4A), and is shown to include an abutment surface 34 and a latch surface 35. The latch surface 35 and abutment surface 34 may be oriented substantially horizontal and parallel to one another. In use, the abutment surface 34 may abut an abutment surface 57 of a stop member 56 of the second jaw 50 (see, e.g., FIG. 6A). Such an engagement may act as a physical constraint to limit how close the handles 12, 14 may be compressed together (i.e., a physical stop) in the full close position. In comparison, the latch surface 35 may be structured to selectively engage with the lock lever 70 to retain, hold, or lock the snip 10 in the full close position. As such and in the locked position, the lock lever 70 may be engaged with the latch surface 35 while the stop member 56 is engaged with the abutment surface 34.

As shown, the geared structure 23 includes a plurality or set of projections, shown as a plurality of teeth 24 and a bearing surface 31 (e.g., cam surface, etc.). The plurality of teeth 24 (e.g., gear teeth) are shown to extend beyond the bearing surface 31 by a distance 37 (e.g., overhang) (based on the longitudinal view depicted in FIGS. 4A-4C). As described herein, such a configuration allows a relatively seamless or smooth mating/meshing with the plurality of teeth 61 and bearing surface 67 of the second jaw 50.

While the geared structure 23 may include any number of teeth, in the example shown, the geared structure 23 includes four (4) gear teeth. Further, the plurality of teeth 24 are shown to have a pitch curvature of C1. The "pitch curvature" refers to the arcuate shaped line of intersection between the plurality of teeth 24 of the geared structure 23 of the lever 18 and the plurality of teeth 61 of the geared structure 60 of the second jaw 50. In this regard, the pitch curvature, C1, may be any shape that corresponds or substantially corresponds with the pitch curvature, C3, of the plurality of teeth 61 of the second jaw 50. In this regard and as described herein, the pitch curvatures C1 and C3 may therefore be "equal and opposite" (defined below). In the embodiment shown, the pitch curvature C1 is non-planar (e.g., curved) and non-circular-shaped. For example, the pitch curvature, C1, may be elliptical-shaped. In another example, the pitch curvature, C1, may be any other arcuate shape. According to an alternate embodiment, the pitch curvature, C1, may be circular shaped.

As also shown, the bearing surface 31 has a curvature, C2. In this regard, the bearing surface 31 is also non-planar in nature (e.g., curved). In one embodiment and in the example shown, the curvature, C2, matches or substantially matches the pitch curvature, C1. For example, the curvature, C2, may be non-circular shaped (e.g., elliptical shaped). In another example, the curvature, C2, may be any arcuate shape (e.g., circular). Furthermore and in this regard, the curvature, C2, of the bearing surface 31 is shown to match or substantially match the curvature, C4, of the bearing surface 67 (see FIGS. 6A-6C). In particular, the curvature C2 is equal and opposite to the curvature C4 of the bearing surface 67 while the pitch curvature C1 is equal and opposite to the pitch curvature C3. Due to this equal and opposite nature, the bearing surfaces 31, 67 and pluralities of teeth 24, 61 may relatively smoothly and repeatedly engage with one another. If the pitch curvatures, C1 and C3, and curvatures, C2 and C4, differed by more than a substantial amount, engagement of the geared structures 23, 60 may be non-smooth (i.e., the tool may be difficult to operate due to the bearing surfaces and/or teeth not engaging smoothly or repeatedly).

According to one embodiment, the pitch curvature, C1, and the bearing surface 31 curvature, C2, are defined based on the bearing surface 67 curvature, C4. In this regard, the pitch curvature, C1, and curvature, C2, are constructed responsive to the bearing surface 67 curvature, C4, being defined. As described below, Applicant has determined that by altering the curvature, C4, the mechanical advantage may be varied to desired amounts at various points throughout the cutting stroke. Therefore, after the desired mechanical advantage curve/profile is determined based on the bearing surface 67 the curvature, C4, this same or substantially the same curvature may be applied/implemented with the plurality of teeth 61 pitch curvature, C3, and subsequently this curvature, C4, may be applied/implemented with, in an equal and opposite manner, the pitch curvature, C1, and the bearing surface 31 curvature, C2, of the lever 18. Thus, the shape and configuration of the bearing surface 31 and pluralities of teeth 24 of the geared structure 23 are dependent on the chosen shape of the bearing surface 67 of the geared structure 60.

As shown, the pitch curvature, C1, of the plurality of teeth 24 and the curvature, C2, of the bearing surface 31 are defined relative to a center of the aperture 21. However and in one embodiment, the pitch curvature, C1, and bearing surface 31 curvature, C2, may be defined from any point as long as these curvatures, C1 and C2, are substantially equal and opposite to the bearing surface 67 curvature, C4, of the second jaw 50. Thus, in other arrangements, the curvature and pitch curvature, C2 and C1, may be defined relative to any point on the lever 18 or not on the lever 18. Further, any formula, algorithm, equation, and the like may be used to define the pitch curvature, C1, and curvature, C2 (as well as pitch curvature, C3, and curvature, C4).

As used herein, the term "match" or "substantially matches" as used to relate to the pitch curvatures C1 and C3 and curvatures C2 and C4 is meant to be broadly interpreted. In this regard, "match" or "substantially matches" may have any interpretation acknowledged by those of ordinary skill in the art. For example, in one embodiment, the terms "match" or "substantially matches" may be defined based on a numerical value (e.g., within five (5) percent, within a certain predefined tolerance, etc.). In another example, the terms "match" or "substantially matches" may be defined based on the functionality/engagement of the pluralities of teeth and bearing surfaces (i.e., if the pluralities of teeth at least partially mesh during the cutting stroke, the pluralities of teeth are considered to have "substantially matching" pitches). In yet another embodiment, the terms "match" or "substantially matches" may be defined as manufacturing tolerances for the curvatures C1, C2, C3, and C4. For example, if the curvatures C2 and C4 are within a manufacturing tolerance, then the curvatures C2 and C4 are considered matching or substantially matching. As also used herein, the phrase "equal and opposite" when referring to the pitch curvatures and bearing surface curvatures means that that the curvatures are equal (e.g., match or substantially matches as defined above) but oppositely oriented, such that the bearing surfaces or pluralities of teeth may engage. Thus, those of ordinary skill in the art will appreciate that the terms "match" or "substantially match" and "equal and opposite" are meant to be broadly interpreted without departing from the spirit and scope of the present disclosure.

As mentioned above, the plurality of teeth 24 are sized and shaped to prevent slippage between the bearing surfaces 31, 67 by engaging, interacting, or otherwise meshing with the plurality of teeth 61 on the geared structure 60 of the second jaw 50. Due to the function of preventing slippage, the size and shape of each tooth in the plurality of teeth 24 and 61 may be dictated by or based on the bearing surface 67 curvature, C4. That is to say, the size and shape of each tooth in the pluralities of teeth 24, 61 may be configured to only prevent relative slippage and to not impact the rolling engagement of the bearing surfaces 31 and 67. As such, the size and shape of each tooth in the plurality of teeth 24 may be highly variable. In particular, the size and shape of each tooth in the plurality of teeth 24 may be any shape corresponding to a sufficient strength to prevent or substantially prevent slippage between the bearing surfaces 31 and 67. In one embodiment, at least one of the teeth in the plurality of teeth 24 corresponds with a different width than another tooth in the plurality of teeth 24. In another embodiment, each tooth in the plurality of teeth 24 may be substantially the same (i.e., substantially the same shape and size) or substantially different from at least one other tooth in the plurality of teeth 24 as long as the plurality of teeth 24 mesh with the plurality of teeth 61 of the geared structure 60 to enable smooth or relatively smooth operation of the tool. Thus, the shape of the teeth of the pluralities of teeth 24, 61 may be any shape and size so long as the pluralities of teeth 24, 61 mesh repeatedly (to enable smooth operation of the tool) and prevent or substantially prevent slippage between the bearing surfaces 31 and 67.

In the example depicted, each tooth in the plurality of teeth 24 has a fluid shape in that the geometry of each tooth in the plurality of teeth 24 utilizes rounded corners or edges (as compared to square or sharp corners). Such a configuration reduces the likelihood that the engagement between the pluralities of teeth 24 and 61 will bind. Rather, such a configuration promotes fluid meshing between the pluralities of teeth 24, 61 to facilitate ease of use of the tool.

As shown, the plurality of teeth 24 include four (4) teeth. The first tooth is proximate a lower portion 25 of the geared structure 23 while the last or fourth tooth is proximate an upper portion 26 of the geared structure 23, whereby the second and third teeth are disposed between the first and fourth teeth. Of course, in other embodiments, any number of teeth may be included in the plurality of teeth 24. Relative to the first aperture 21 of the second pivot connection 82 to the pitch curvature C1, the first tooth is at a distance 27, the second tooth is at a distance 28, the third tooth is at a distance 29, and the fourth tooth is at a distance 30. As shown, the distance 30 is greater than distance 29, which is greater than distance 28, which is greater than distance 27. Thus, and as mentioned above, the pitch curvature C1 is curve-shaped, but non-circular. Further, the changing distance relative to the second pivot connection 82 (i.e., aperture 21) indicates how the gear ratio changes or varies from a relatively lower gear ratio to a relatively higher gear ratio as the pitch curvature moves further from the second pivot connection 82 (i.e., the gear ratio at the fourth tooth is relatively greater than at the third tooth due to the distance 30 being greater than the distance 29; the gear ratio at the third tooth is relatively greater than at the second tooth due to the distance 29 being greater than the distance 28; and, the gear ratio at the second tooth is relatively greater than at the first tooth due to the distance 28 being greater than the distance 27). In this regard, the gear ratio of the geared structure 23 relative to the second pivot connection 82 is at a minimum in the full open position (i.e., when the first tooth is at least partly engaged with a tooth of the geared structure 60 because the first tooth is at a minimum distance 27 from the second pivot connection 82 relative to the remaining teeth of the geared structure 23) and a maximum in the full close position (i.e., when the fourth tooth is at least partly engaged with a tooth of the geared structure 60 because the fourth tooth is at a maximum distance 30 from second pivot connection 82 relative to the remaining teeth of the geared structure 23). Thus, due to the varying distances from the aperture 21 to the pitch curvature C1, a variable gear ratio or shifting ratio is implemented with the pluralities of teeth 24, 61. As described herein below, a similar (but opposite) configuration is provided with the plurality of teeth 61 of the geared structure 60 of the second jaw 50. Despite the changing distance, as shown, the curvature C1 is relatively smooth (i.e., non-jagged), which indicates a relatively smooth change between each distance (i.e., 27 to 28, 28 to 29, and 29 to 30) to, in turn, at least partly provide a relatively smooth engagement with the plurality of teeth 61 of the geared structure 60 of the second jaw 50.

Figure 5A:
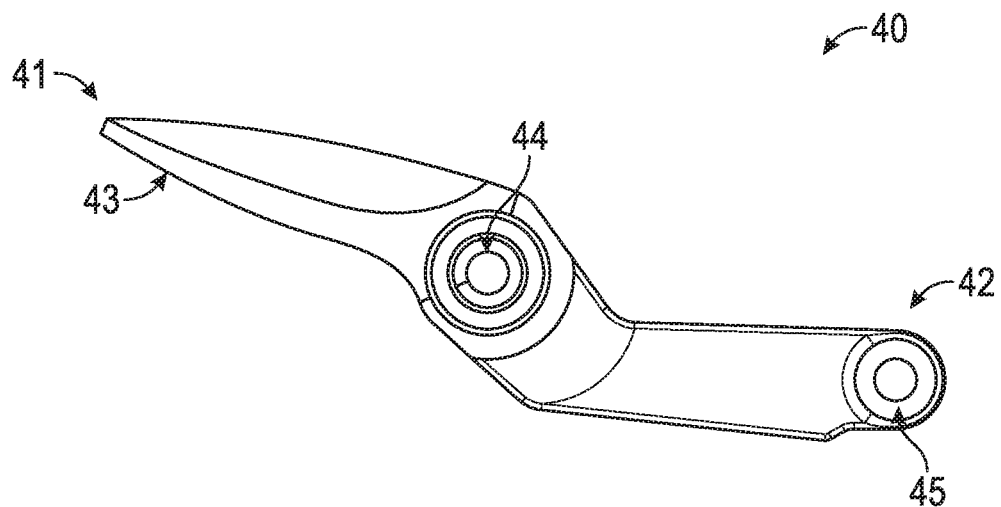
FIGS. 5A-5B are front longitudinal (FIG. 5A) and rear longitudinal (FIG. 5B) views of a first jaw for the one-hand operated cutting tool of FIGS. 1-2, according to exemplary embodiments.
Figure 5B:
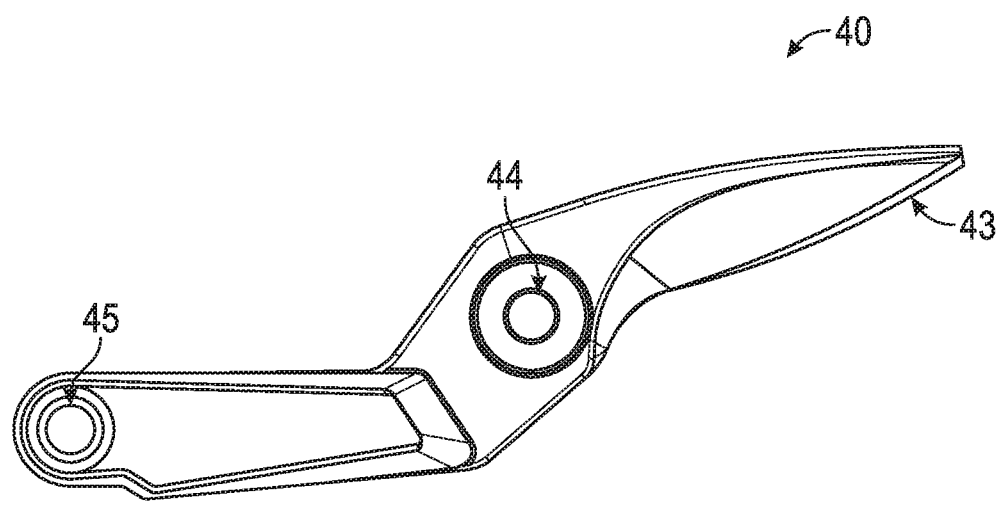

Referring now to FIGS. 5A-5B, front longitudinal (FIG. 5A) and rear longitudinal (FIG. 5B) views of the first jaw 40, are shown according to exemplary embodiments. As shown, the first jaw 40 includes a first end 41, a second end 42, and a functional member, shown as a cutting member 43. The first jaw 40 also defines first and second apertures 44 and 45, respectively. The first end 41 is shown to correspond with the cutting member 43 and while the second end 42 corresponds with a driven end of the first jaw 40. The "driven" characteristic is based on a user force being applied to the lower handle 14 to move the lower handle 14 towards the upper handle 12 (i.e., during the cutting stroke), which in turn drives the first jaw 40 at the second pivot connection 82 to move, drive, or rotate the cutting member 43 about the first pivot connection 80 toward the cutting member 53 of the second jaw 50. In the example depicted, the cutting member 43 is structured as a blade. However, in other embodiments, the cutting member 43 may have any type of configuration: a serrated blade, a hook, an anvil, and so on. As mentioned above, the first jaw 40 is coupled to the second jaw 50 at the first pivot connection 80 and coupled to the lever 18 at the second pivot connection 82.

In the embodiment depicted and with reference to FIG. 3, the first and second apertures 44, 45 define a circular or mostly circular cross-section to enable reception of the bolts 92 and 93, respectively. However, this depiction is not meant to be limiting as the first and second apertures 44 and 45 (e.g., holes, bores, orifices, openings, etc.) may have any shape and size to facilitate rotatable coupling with each of the second jaw 50 (at the first pivot connection 80) and the lever 18 (at the second pivot connection 82).

According to one embodiment and as depicted, the first jaw 40 is constructed from a metal or metal alloy and is of unitary or integral construction (i.e., a one-piece component). Such a configuration facilitates cutting of other metal-based materials, such as tin. In this regard, the first jaw 40 may be cast, forged, and/or constructed from any other suitable process(es). In other embodiments, the first jaw 40 may be constructed from plastic, composite, metal and another material (e.g., plastic), etc. and be formed from two or more components. As such, the example illustration is not meant to be limiting.

Figure 6A:
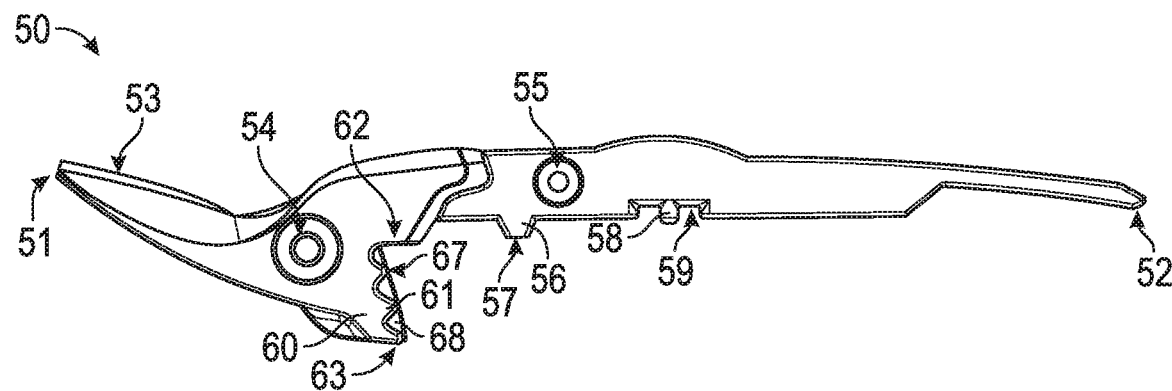
FIGS. 6A-6C are front longitudinal (FIG. 6A), rear longitudinal (FIG. 6B), and close-up (FIG. 6C) views of a second jaw for the one-hand operated cutting tool of FIGS. 1-2, according to exemplary embodiments.
Figure 6B:
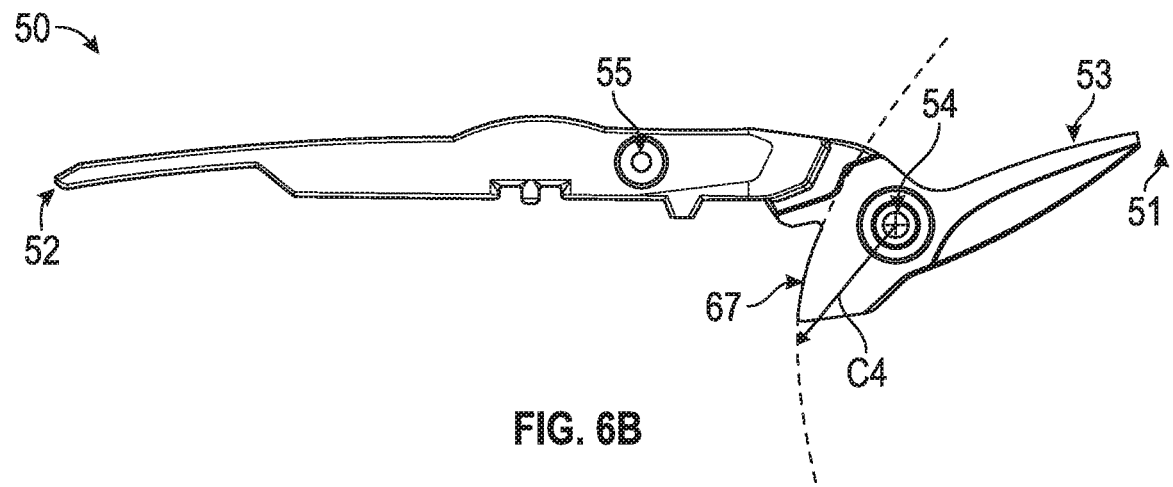
Figure 6C:
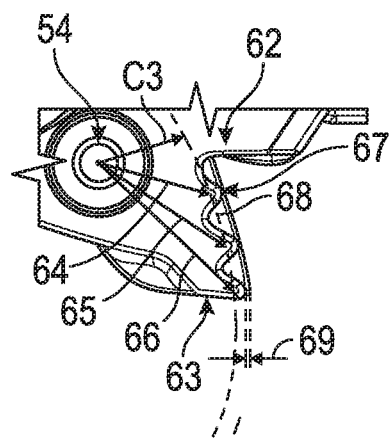

Referring now to FIGS. 6A-6C, front longitudinal (FIG. 6A), rear longitudinal (FIG. 6B), and close-up (FIG. 6C) views of the second jaw 50, are shown according to exemplary embodiments. As shown, the second jaw 50 has a first end 51 and a second end 52, the second end 52 positioned longitudinally opposite the first end 51. As also shown, the second jaw 50 includes a functional member, shown as a cutting member 53, proximate the first end 51, a first aperture 54, a second aperture 55, a stop member 56, a projection 58, and a geared structure 60. Similar to the cutting member 43 of the first jaw 40, the cutting member 53 of the second jaw 50 may have any shape and structure. In the embodiment depicted, the cutting member 53 is structured as a blade. However, in other embodiments, the cutting member 53 may be structured as a serrated blade, an anvil, a hook, and so on. In use and as described herein, the cutting member 53 cooperates with the cutting member 43 to effectuate a cutting force to cut, slice, rupture, and otherwise sever an object of the snip 10.

As shown, the second jaw 50 is structured as a substantially flat structure or body, wherein the geared structure 60 is raised relative to the remaining portion of the second jaw 50 (i.e., offset or elevated out-of-the-page relative to the remaining portion of the second jaw 50 based on the viewpoint shown in FIGS. 6A-6B). Due to this structure, the second jaw 50, like the lever 18, may be formed or constructed from a variety of materials and in a variety manners. For example and in one embodiment, the second jaw 50 may be of unitary construction (i.e., all one piece), where the second jaw 50 may be cast (e.g., die cast), molded (e.g., injection molded), extruded, machined/formed, etc. In another embodiment and due to the relatively flat structure, the geared structure 60 may be a separate component from the remainder of the second jaw 50. As such, the second jaw 50 and geared structure 60 may be joined by any suitable manner (e.g., a bonding agent, a fastener such as a set screw, a combination thereof, etc.) to form the stacked structure. Accordingly, the second jaw 50 may be constructed from any suitable material, including but not limited to, metal, metal alloys, plastic, composites, and any combination thereof. Further, such a relatively flat construction facilitates ease of manufacturing of the second jaw 50 and snip 10 in general.

As mentioned above, the second jaw 50 defines a first aperture 54 and a second aperture 55, where the first aperture 54 is disposed in the geared structure 60 and proximate the first end 51 and cutting member 53 while the second aperture 55 is disposed between the first aperture 54 and the second end 52. In particular and in this example, the second aperture 55 is disposed between the stop member 56 and projection 58. However, such an arrangement is exemplary only and not meant to be limiting. In use and as described above, the first aperture 54 is structured to receive bolt 90 while the second aperture 55 is structured to receive the bolt 92. Accordingly, the first and second apertures 54, 55 (e.g., openings, orifices, holes, etc.) may have any shape and size that enable reception of the bolts 90 and 92 and permit rotatable coupling of the first jaw 40 to the second jaw 50 at the first pivot connection 80 and the lock lever 70 to the second jaw 50 at the third pivot connection 84. In the example depicted, the first and second apertures 54, 55 are shown to define a circular or substantially circular cross-section. However, in other embodiments, the first and second apertures 54, 55 may define rectangular, oval, square, etc. cross-sectional shapes. Further and according to an alternate embodiment, the second aperture 55 may be excluded from the second jaw 50. In this embodiment, the snip 10 may not utilize a locking mechanism, such as the lock lever 70.

As mentioned above, the second jaw 50 includes a projection 58 and a stop member 56 having an abutment surface 57. Each of the stop member 56 and projection 58 extends vertically downward from the second jaw 50 (i.e., toward the lever 18 when the snip 10 is assembled). When the snip 10 is in the full close position, the abutment surface 57 engages with the abutment surface 34 to act as a physical stop for the full close position. Accordingly, the abutment surface 57 may have any structure that allows for the engagement with the abutment surface 34 (e.g., horizontal or planar, substantially horizontal, etc.). In comparison, the projection 58 is structured to engage with the spring 85. As shown, the projection 58 extends downward from the second jaw to define two cavities 59 (e.g., craters, hollows, voids, etc.). In use and because the spring 85 may be structured as a coil spring, the coils may be received in the cavities 59. In conjunction, the projection 58 may extend at least partially into the coils of the spring 85. In one embodiment, an interference fit may be created between the projection 58 and the coils of the spring 85. The interference fit facilitates a substantially secure joining, fastening, or coupling of the spring 85 to the second jaw 50. In another embodiment and due to a maximum full open position existing for the handles 12, 14, the spring 85 may engage with the projection 58 in a non-interference fit relationship yet still be substantially secure due to the walls of the cavities 59 and the projection 58 substantially limiting the range of motion (e.g., sliding of the spring 85) relative to the second jaw 50. In yet another embodiment, another aperture may be defined by the second jaw for receiving an end of the spring 85 to securely or relatively securely couple the spring 85 to the second jaw 50. All such variations are intended to fall within the scope of the present disclosure.

As shown in FIG. 1 and now in particular in FIGS. 6A-6C, the geared structure 60 forms part of the variable mechanical advantage system 100. The geared structure 60 is shown to include a plurality or set of projections, shown as a plurality of teeth 61, a bearing surface 67 (e.g., cam surface), and a support surface 68. As shown, the geared structure 60 extends vertically downwards below the first pivot connection 80 (based on the view depicted in FIG. 1). As described herein, such an arrangement facilitates and enables engagement with the first geared structure 23 of the lever 18 to, in turn, impart additional force, leverage, etc. into the snip 10 and, in particular, the cutting member 53 of the second jaw 50 relative to conventional one-hand operated cutting tools.

As shown and mentioned above, the plurality of teeth 61 are shown to have a pitch curvature, C3, while the bearing surface 67 has a curvature, C4. As also shown, the pitch curvature, C3, is non-circular and curve shaped (e.g., elliptical shaped) to match or substantially match the pitch curvature, C1, of the plurality of teeth 24 of the geared structure 23 of the lever 18, except being equal and opposite. In other embodiments, the pitch curvature, C3, may be any other shape that corresponds with the pitch curvature, C1, of the plurality of teeth 24 of the lever 18 (except equal and opposite). Further, the bearing surface 67 curvature C4 may match or substantially match the pitch curvature C3. To facilitate relative smooth operation of the tool, the bearing surface curvature C4 may match or substantially match the pitch curvature C3 while the bearing surface 31 curvature C2 is equal and opposite to the bearing surface curvature C4 and the pitch curvature C1 is equal and opposite to the pitch curvature C3. In other words, the pitch curvatures and curvatures substantially match each other. As alluded to above, if the pitch curvatures and curvatures differed by more than a substantial amount, the tool may not function correctly (e.g., be difficult to operate).

Due to the plurality of teeth 61 preventing or substantially preventing relative slippage between the bearing surfaces 31 and 67, each tooth in the plurality of teeth 61 may have different sizes and shapes like the plurality of teeth 24 of the geared structure 23 of the lever 18. That is to say, the size and shape of each tooth in the plurality of teeth 61 may be dictated by or based on the bearing surface 67 curvature, C4. As such, the size and shape of each tooth in the plurality of teeth 61 may be variable relative to each other. Similar to the configuration of the plurality of teeth 24, any size and shape of the teeth of in plurality of teeth 61 may be used so long as they are of sufficient strength and configured to mesh with the plurality of teeth 24. In this regard and like the plurality of teeth 24, each tooth in the plurality of teeth 61 may be substantially the same (i.e., substantially the same shape and size) or substantially different from at least one other tooth in the plurality of teeth 61 as long as the plurality of teeth 61 mesh with the plurality of teeth 24 to enable smooth or relatively smooth operation of the tool.

Further and like the teeth in the plurality of teeth 24, in the example depicted, each tooth in the plurality of teeth 61 has a fluid shape in that the geometry of each tooth in the plurality of teeth 61 utilizes rounded corners or edges (as compared to square or sharp corners). Such a configuration reduces the likelihood that the engagement between the pluralities of teeth 24 and 61 will bind. In this regard, such a configuration promotes fluid meshing between the pluralities of teeth 24, 61 to facilitate ease of use of the tool.

In this example, the geared structure 60 includes three (3) teeth. The first tooth is proximate an upper portion 62 of the geared structure 60 while the last or third tooth is proximate a lower portion 63 of the geared structure 60, whereby the second tooth is disposed between the first and third teeth. Of course, in other embodiments, any number of teeth may be included in the plurality of teeth 61. Relative to the first aperture 54 of the first pivot connection 80 to the pitch curvature C3, the first tooth is at a distance 64, the second tooth is at a distance 65, and the third tooth is at a distance 66. As shown, the distance 66 is greater than distance 65, which is greater than distance 64. In this regard, a distance between a projection (i.e., tooth) in the first set of projections (i.e., plurality of teeth 61) to the first pivot connection 80 is different from a distance between at least one other projection in the first set of projections to the first pivot connection 80. Thus, and as mentioned above, the pitch curvature C3 is curve-shaped, but non-circular. Further, the changing distance relative to the first pivot connection 80 (i.e., aperture 54) indicates how the gear ratio changes or varies from a relatively higher gear ratio to a relatively lower gear ratio as the pitch curvature moves closer to the first pivot connection 80 (i.e., the gear ratio at the third tooth is relatively greater than at the second tooth due to the distance 66 being greater than the distance 65; and, the gear ratio at the second tooth is relatively greater than at the first tooth due to the distance 65 being greater than the distance 64). In this regard, the gear ratio of the geared structure 60 relative to the first pivot connection 80 is at a maximum in the full open position (i.e., when the third tooth of the geared structure 60 is at least partly engaged with a tooth from the plurality of teeth 24 because the third tooth at a maximum distance 66 from the first pivot connection 80 relative to the remaining teeth of the geared structure 60) and at a minimum in the full close position (i.e., when the first tooth of the geared structure 60 is at least partly engaged with a tooth in the plurality of teeth 24 because the first tooth is at a minimum distance 64 from the first pivot connection 80 relative to the remaining teeth of the geared structure 60).

As shown, the curvature, C4, and pitch curvature, C3, of the plurality of teeth 61 are defined relative to the first aperture 54. In this regard and as mentioned above with regard to the pitch curvature, C1, and the bearing surface 31 curvature, C2, any formula, algorithm, process, equation or other suitable methodology may be used to define the curvature, C4, and pitch curvature, C3, relative to the first aperture 54 or any other desired point. In particular, Applicant has determined that utilizing relatively more handle movement for a given portion of the blade travel increases the leverage for that segment (i.e., portion of the cutting stroke). Thus, Applicant has determined that shaping the bearing surface 67 curvature C4 to coincide with relatively more handle movement at or near a segment of the cutting stroke proximate the full open position coincides with relatively more leverage or force being transmitted to the cutting members 43 and 53 at or near that segment of the cutting stroke proximate the full open position. As a result, relatively more mechanical advantage may be provided near the full open position to increase the ease of use of the tool of the present disclosure relative to conventional hand-operated cutting tools. Because the overall travel of the handles 12 and 14 is finite, a corresponding reduction in handle movement is designed into other portions of the cut to maintain a proper motion.

Relative to the geared structure 23 of the lever, the bearing surface 67 is shown to extend beyond a top land (i.e., tip) of the furthest extending gear tooth of the plurality teeth 61 by a distance 69 (as shown in the close-up longitudinal side view of geared structure 60 in FIG. 6C). In other embodiments, the bearing surface 67 may match or substantially match a tip or top land portion of a furthest extending tooth of the plurality of teeth 61. In comparison, the plurality of teeth 24 of the geared structure 23 are shown to extend beyond the bearing surface 31 of the lever 18. In other embodiments, this arrangement may be reversed: the bearing surface 31 may extend at least partially beyond a tip or top land of the furthest extending tooth of the plurality of teeth 24 while the plurality of teeth 61 overhang or extend beyond the bearing surface 67.

The support surface 68 is disposed between the spaces defined by adjacent gear teeth in the plurality of teeth 61. Further, the support surface 68 may be interconnected with the bearing surface 67, where the support surface 68 is positioned in a plane perpendicular or substantially perpendicular to the plane of the bearing surface 67 (based on the viewpoint depicted in FIG. 6C). In this regard, the support surface 68 and bearing surface 67 may form a singular component. In the example shown, the support surface 68 is substantially planar or flat in nature. Because the support surface 68 may be disposed between the spaces, the spaces or gaps between adjacent gear teeth do not define a through-hole. In comparison to the geared structure 23 of the lever 18, because the plurality of teeth 24 extend beyond the bearing surface 31, the spaces or gaps defined between adjacent gear teeth in the plurality of teeth 24 do define through-holes.

In use and as alluded to above, the bearing surface 67 of the second jaw 50 may engage with the bearing surface 31 of the lever 18. This engagement defines the variable mechanical advantage of the system 100, while the engagement of the pluralities of teeth 24, 61 may prevent or substantially prevent slippage between the rolling contact engagement of the bearing surfaces 31 and 67. In particular, the bearing surface 31 may rotate with respect to the bearing surface 67 during the cutting stroke and opening stroke. In this regard, the bearing surface 31 and the bearing surface 67 may be in rolling contact or rolling engagement with each other. In this regard, the bearing surface 67 and bearing surface 31 are in at least partial contact throughout the cutting stroke. Accordingly, the bearing surface 67 and bearing surface 31 may be structured as relatively smooth surfaces to prevent friction between the surfaces 31, 67 to allow for the relatively smooth rotation.

As described herein, the bearing surface 67 curvature C4 may define a particular mechanical advantage profile for the one-hand operated cutting tool. In this regard, the bearing surface 67 is non-planar (e.g., curved) in nature and slopes towards the first aperture 54 to define a variable mechanical advantage. In particular and as shown and described herein with reference to FIG. 6C, the bearing surface 67 curvature, C4, is non-circular shaped. For example, the curvature, C4, may be elliptical shaped. However, in other embodiments, any other non-planar curvature, C4, may be utilized (e.g., circular shaped). As mentioned herein, the first and second jaws 40, 50 rotate about the first aperture 54 (e.g., first pivot connection 80). Due to the non-planar nature of the bearing surface 67 curvature, C4, the rolling contact point or engagement point between the bearing surfaces 31 and 67 varies in distance relative to the first aperture 54 (i.e., first pivot connection 80). Due to this variance in distance, the moment arm from the rolling point of contact to the first aperture 54 may also vary. As a result, the torque or mechanical advantage imparted onto the cutting member 53 may vary as well. Beneficially, Applicant has determined that by changing or modifying the curvature, C4, the mechanical advantage may be tailored to meet or substantially meet a desired mechanical advantage characteristic. In the example shown herein and with reference to FIGS. 8A-10, the curvature, C4, provides a maximum mechanical advantage at or near the full open position to provide users the most or substantially the most mechanical advantage when their hand strength is the weakest or substantially the weakest.

Referring now collectively to FIGS. 7A-7D, the lock lever 70 is illustrated according to various exemplary embodiments. The lock lever 70 may be structured to selectively and rotatably engage with the latch surface 35 of the latch 32 of the lever 18 to retain or securably hold the handles 12, 14 in the full close position. In some embodiments, the lock lever 70 may be excluded from the snip 10. In yet other embodiments, the lock lever 70 may be replaced with a different locking mechanism for holding the handles 12, 14 in the full close position. For example, a push rod may be utilized that is received in an opening of the lever to hold the handles together in the full close position. Accordingly, those of ordinary skill in the art will appreciate that many different forms of locking mechanisms may be used with all such variations intended to fall within the scope of the present disclosure.

As shown, the lock lever 70 includes a first wall 71, a second wall 72 facing the first wall 71, a tab 73 extending outward from the second wall 72, a first aperture 74 defined by the first wall 71, a second aperture 75 in line (i.e., sharing or substantially sharing a through-hole axis) with the first aperture 74 and defined by the second wall 72, and a lock member 76 having a locking surface 77. As shown, the lock lever 70 is u-shaped or substantially u-shaped. In this regard and in use, the u-shaped nature of lock lever 70 may be positioned to at least partially surround a portion of the second jaw 50 (i.e., the first wall 71 is at least partially disposed on one longitudinal side of the second jaw 50 while the second wall 72 is at least partially disposed on an opposite longitudinal side of the second jaw 50). In particular, the lock lever 70 is positioned about the second jaw 50 to align or substantially align the first and second apertures 74, 75 (e.g., holes, orifices, bores, etc.) with the second aperture 55 of the second jaw 50 to enable/allow insertion of the bolt 92 through each of the apertures 55, 74, and 75 to form the third pivot connection 84. To facilitate insertion of the bolt 92, the first and second apertures 74, 75 may have any shape and size. In the example shown, the first and second apertures 74, 75 have a circular cross-section. However, in other embodiments, the first and second 74, 75 apertures may be rectangular, square, etc.

The tab 73 (e.g., projection, flange, fin, etc.) may be structured as a user interface projection that allows a user to push or pull the lock lever 70 to enable rotation of the lock lever 70 at the third pivot connection 84 (e.g., about the bolt 92). Accordingly, while the tab 73 is shown as substantially rectangular, the tab 73 may have any shape and size that allows a user to push or pull to rotate the lock lever 70 to selectively engage with the latch 32 of the lever 18.

The lock member 76 is shown to extend in a plane perpendicular to the tab 73. Accordingly, as a user moves the tab 73, the lock member 76 also moves. As shown, the lock member 76 includes a locking surface 77 that is substantially planar. In use, the locking surface 77 engages with the latch surface 35 to lock the lock lever 70 to the lever 18. Because the lock lever 70 is rotatably coupled to the second jaw 50, locking of the lock lever 70 to the lever 18 also causes locking or retention of the second jaw 50 to the lever 18.

According to one embodiment, the lock lever 70 is of integral or unitary construction (i.e., a single or one-piece component). In other embodiments, the lock lever 70 may comprise two or more components (e.g., the tab 73 may be fastened to the remainder of the lock lever 70). In either situation, the lock lever 70 may be constructed from a variety of materials including, but not limited to, metal, metal alloys, plastics, composites, and any combination thereof.

Figure 8A:
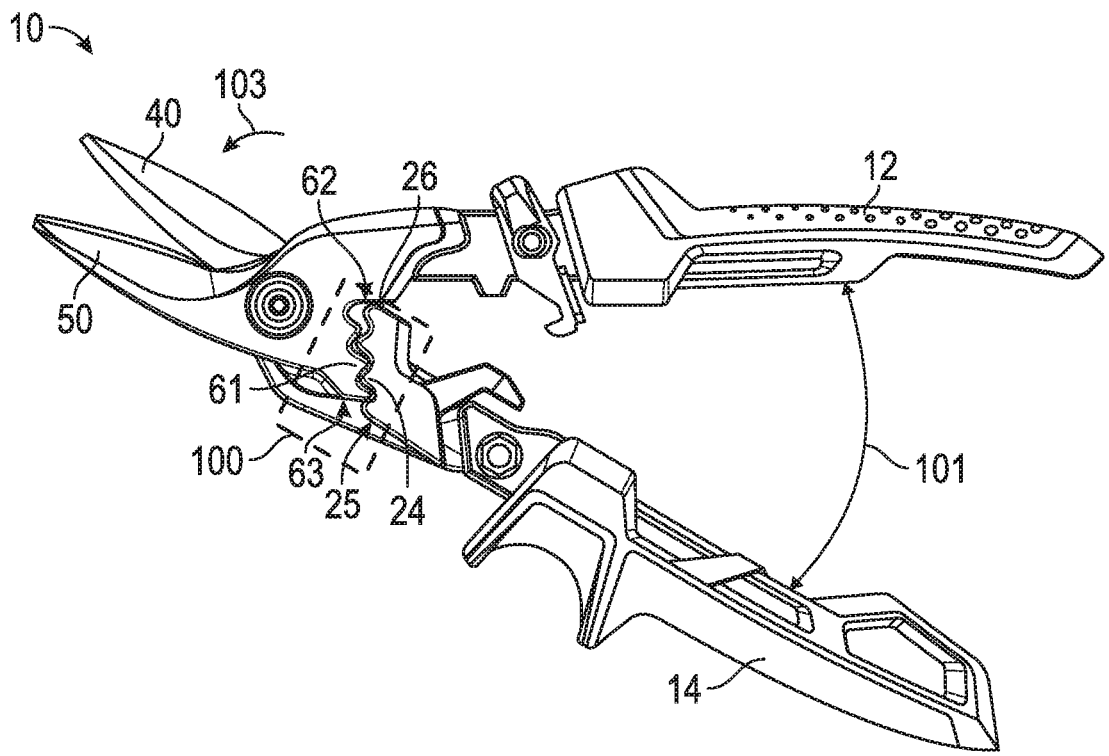
FIGS. 8A-8F are schematic images pictorially illustrating a cutting stroke for the one-hand operated cutting tool of FIGS. 1-2, according to an exemplary embodiment.
Figure 8B:
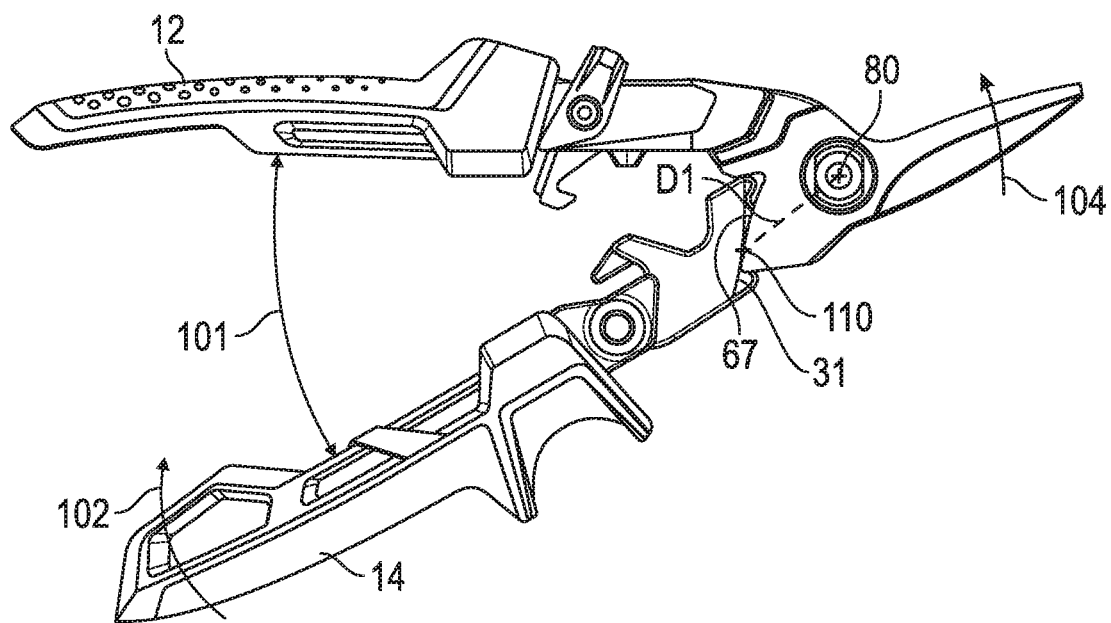
Figure 8C:
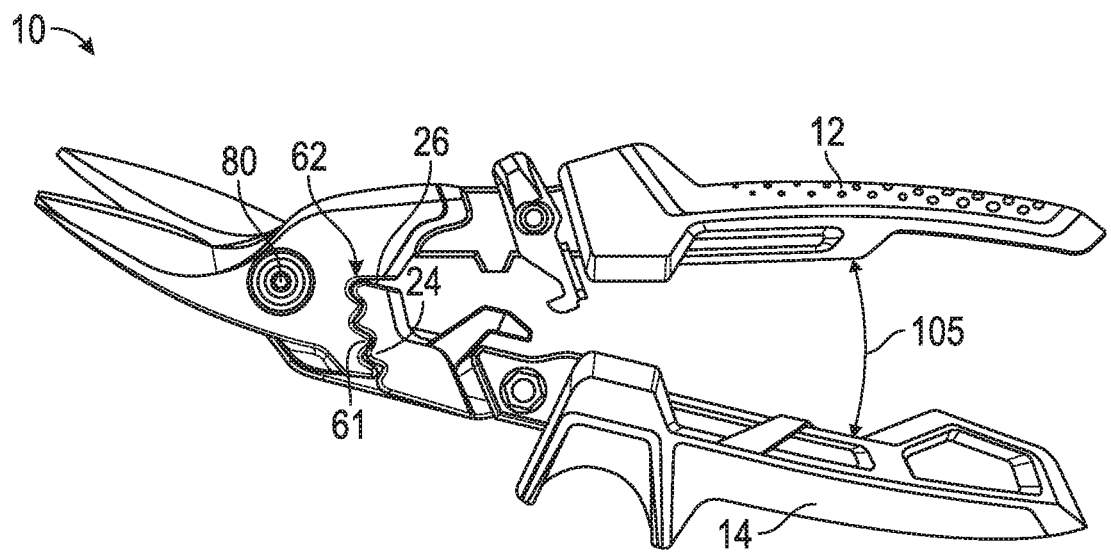
Figure 8D:
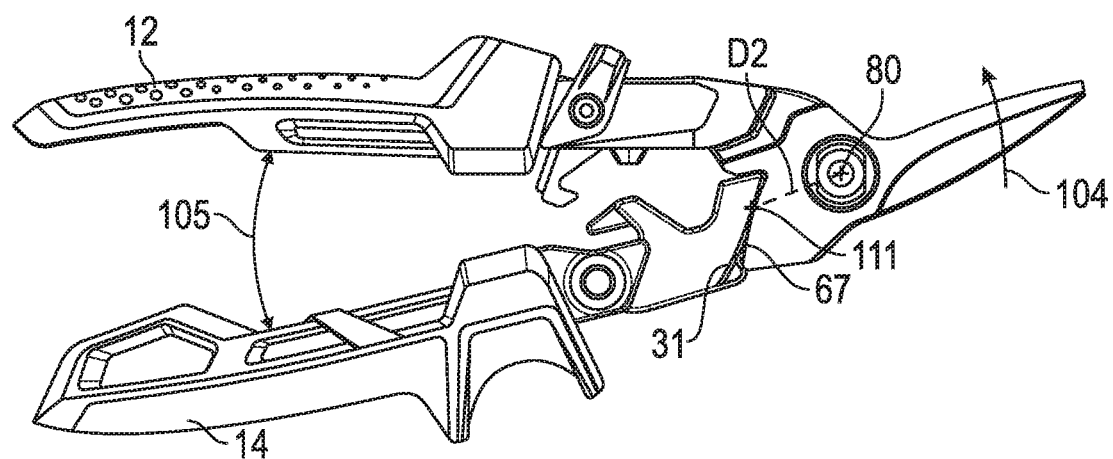
Figure 8E:
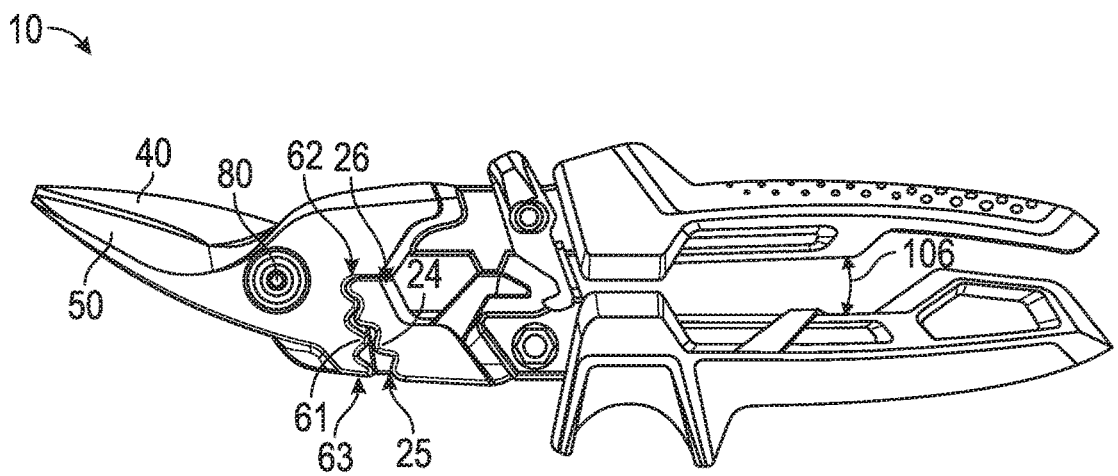
Figure 8F:
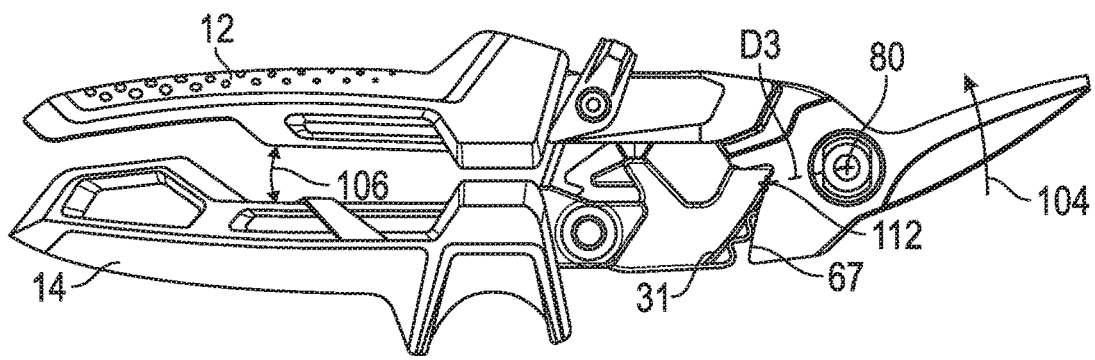

With the aforementioned description in mind, referring now collectively to FIGS. 8A-8F, a pictorial representation of a cutting stroke for the snip 10 using the variable mechanical advantage system 100 is shown according to an exemplary embodiment. For reference, FIGS. 8A, 8C, and 8E represent front longitudinal views of the snip 10 while FIGS. 8B, 8D, and 8F represent back longitudinal views of the snip 10. In particular, FIGS. 8A-8B correspond with the same handle/angle position, FIGS. 8C-8D correspond with the same handle angle/position, and FIGS. 8E-8F correspond with the same handle angle/position for the snip 10. It should be understood that FIGS. 8A-8F do not show the spring 85 for illustrative purposes only. In this regard, the spring 85 has been excluded to provide clarity to the depictions and is not meant to be limiting. Further, the first jaw 40 has also been excluded from FIGS. 8B, 8D, and 8F. This is done for clarity to show the rolling contact engagement of the bearing or cam surfaces 31 and 67.

In FIGS. 8A-8B, the snip 10 is in the full open position. In the full open position, the handles 12, 14 are at a maximum separation angle 101 and distance from each other. As shown, teeth in the lower portion 25 of the plurality of teeth 24 of the geared structure 23 of the lever 18 are at least partially engaged with teeth in a lower portion 63 of the plurality of teeth 61 of the geared structure 60 of the second jaw 50. As the lower handle 14 is moved towards the top handle 12 by the user, the force provided by the user (e.g., a user force 102) causes the drive end 42 of the first jaw 40 to drive the cutting member 43 of the first jaw 40 about the first pivot connection 80 to impart a force 103 on the cutting member 43 to move the cutting member 43 towards the cutting member 53. In comparison, as the top handle 12 is moved by the user toward the lower handle 14 during the cutting stroke, the second cutting member 53 is rotated about the pivot connection 80 toward the first cutting member 43. As described herein, a variable mechanical advantage may be imparted into the second cutting member 53 to amplify or increase the force provided by the user.

In the full open position and before such movement, the bearing surfaces 31 and 67 are engaged at a rolling contact point 110, which is at a distance D1 from a center of the first pivot connection 80. As described above, the bearing surfaces 31 and 67 may always be in contact during the cutting stroke when the curvatures, C2 and C4, match or substantially match. Based on the engagement point 110 being at a distance D1 to the first pivot connection 80, a torque 104 is generated. The torque or force 104 represents the mechanical advantage provided by the engagement of the bearing surfaces 31 and 67 and represents the mechanical advantage from the user force 102 at the engagement point of the bearing surfaces 31 and 67 (e.g., engagement point 110, 111, and 112) to the cutting member 53. In use, as the handle 14 is actuated into the full close position, the rolling contact engagement point pushes or moves the geared structure 60 counterclockwise (based on the viewpoint depicted in FIG. 8B) to impart an opposite direction rotational force 104 relative to the force 103. In other words, the rolling contact engagement point of the bearing surfaces 31 and 67 represents the force translation point from the user on the handle 14 to the second jaw 50. This force translation is shown schematically in FIG. 9.

Due to the bearing surface 67 at least partially extending beyond a top land or tip of a furthest extending tooth in the plurality of teeth 61, the bearing surfaces 31, 67 form a relatively stronger engagement than the pluralities of teeth 24, 61. In turn, a relatively greater amount of force is carried or transmitted from the engagement of the bearing surfaces 31 and 67 than from the engagement of the pluralities of teeth 24, 61. In this regard and as mentioned above, the at least partial engagement of the pluralities of teeth 24, 61 are structured to prevent or substantially prevent slippage between the bearing surfaces 31, 67, such that the torque or force 104 is transmitted nearly completely to cause closing of the jaws 40, 50 and not dissipated or lost.

As shown in FIGS. 8C-8D, the handles 12, 14 have moved closer toward the full close position. In the position depicted, the handles 12,14 are separated by an angle 105, which corresponds to an angle between the full open position angle 101 and the full close position angle 106. In this intermediate position, the plurality of teeth 24 have rotated counterclockwise upward toward the upper portion 62 of the plurality of teeth 61 of the geared structure 60. As a result, the upper portion 62 of the plurality of teeth 61 has become closer to the upper portion 26 of the plurality of teeth 24 of the lever 18 (i.e., a relatively smaller separation distance than in the full open position of FIGS. 8A-8B). Further and relative to the full open position in FIGS. 8A-8B, in this partial open position, each tooth of the pluralities of teeth 24, 61 are at least partially engaged.

As also shown, the rolling contact engagement point 111 is at a distance, D2, that is relatively closer to the first pivot connection 80 than the distance, D1. As a result, the moment arm is relatively smaller in this position than in the full open position. Accordingly, the torque, force, or mechanical advantage 104 provided in this intermediate position may be relatively smaller than that provided in the full open position.

At the conclusion of the cutting stroke when the handles 12 and 14 are at a minimum separation angle 106 and as shown in FIGS. 8E-8F, the upper part 26 of the plurality of teeth 24 of the lever 18 are proximate the upper part 62 of the plurality of teeth 61 of the second jaw 50. In this regard, the upper parts 26, 62 are in contact or substantial contact with each other. In comparison, the lower part 25 of the plurality of teeth 24 is at a separation distance from the lower part 63 of the plurality of teeth 61. Further, a rolling contact engagement point 112 is at a distance, D3, from the first pivot connection 80. As shown, the distance, D3, is less than the distance, D2. In this regard, the force, torque, or mechanical advantage 104 provided by the variable mechanical system 100 is less than the mechanical advantage provided in either the intermediate position (FIGS. 8C-8D) or the full open position (FIGS. 8A-8B).

Figure 9:
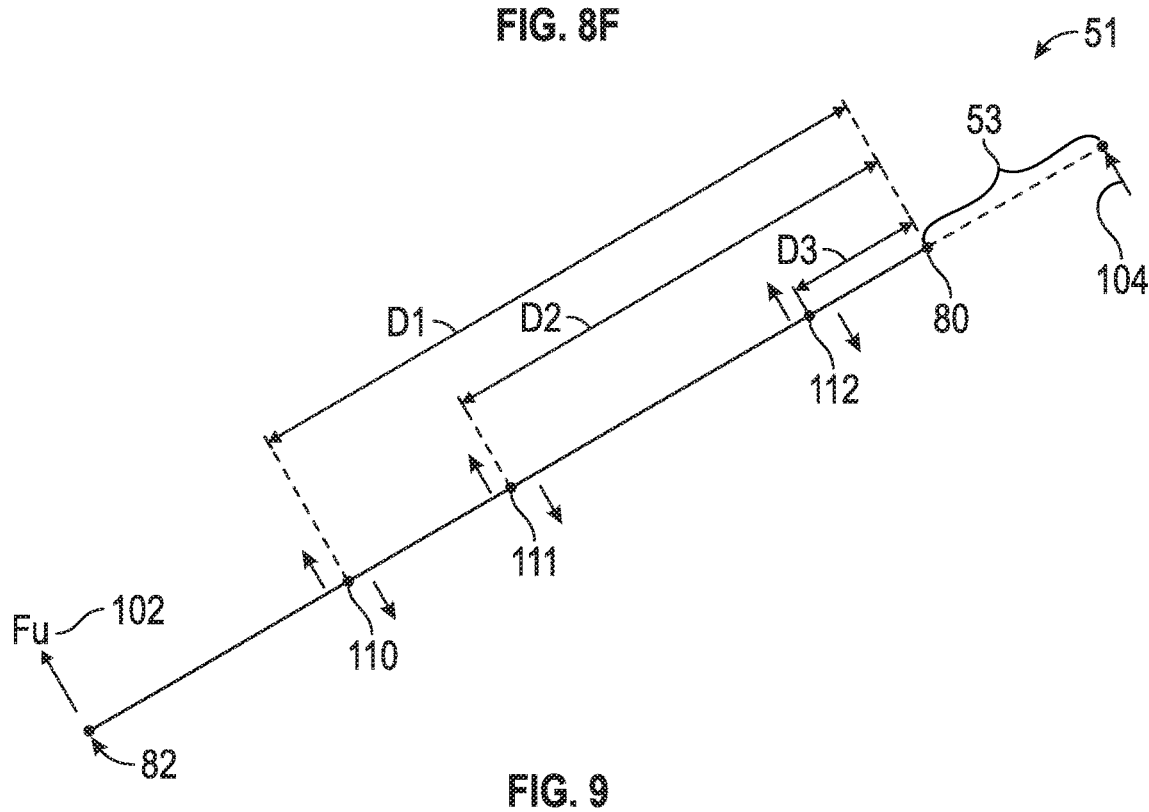
FIG. 9 is a force diagram of the interaction of the bearing surfaces during the cutting stroke of the one-hand operated cutting tool of FIGS. 1-2, according to an exemplary embodiment.

Referring now to FIG. 9, a force diagram of the interaction of the bearing surfaces during the cutting stroke, is shown according to an exemplary embodiment. As shown, the diagram is based on the cutting stroke of the snip 10 depicted in FIGS. 8A-8F and is based on the viewpoint depicted in FIG. 8B (for upwards/downwards reference purposes). Accordingly, the same reference numbers may be used in explanation of diagram.

During the cutting stroke, the user applies a force 102, $F_u$, when the user squeezes the lower handle 14 towards the upper handle 12 and vice versa (i.e., an upward force on handle 14 and a downward force on handle 12 based on the viewpoint in FIG. 8B). The user force 102, $F_u$, is translated into the cutting force, which is the combination of the force imparted onto the first jaw 40 (force 103) and the second jaw 50. In this regard, the force on the second jaw 50 includes a user part (i.e., from the user squeezing or moving the top handle 12 toward the bottom handle 14) and a mechanical advantage part, which is the mechanical advantage caused from the interaction of the bearing surfaces 31 and 67, and is represented as force 104. Thus, while the force 104 is defined herein as just the mechanical advantage part, this definition is not meant to imply that no other force(s) is imparted onto the cutting member 53 and second jaw 50. Rather, this designation is done for clarity to show how the variable mechanical advantage may be implemented with hand operated cutting tools. Further, it should be understood that the diagram of FIG. 9 represents just the upward user force on the handle 14 (like shown in FIG. 8B).

As shown, based on a user force 102, the bearing surface 31 imparts an upward force onto the bearing surface 67 at each engagement point 110, 111, and 112 (i.e., the force arrow on the left side of the engagement points 110, 111, and 112 in FIG. 9). The upward force causes a downward force on the bearing surface 67 at each engagement point 110, 111, and 112 (i.e., the force arrow on the right side of the engagement points 110, 111, and 112 in FIG. 9). The downward force causes rotational movement of the cutting member 53 about the first pivot connection 80 toward the cutting member 43. As mentioned above, the imparted rotational movement of the jaw 50 and, in particular the cutting member 53, from the rolling engagement of the bearing surfaces 31 and 67 at least partially represents the mechanical advantage provided to the one-hand operated cutting tool of the present disclosure.

As also shown, the force translation point from the bearing surface 31 and 67 engagement decreases in distance relative to the first pivot connection 80 from the full open position to the full close position. As a result, the moment arm (i.e., the distance from the rolling contact engagement point to the first pivot connection 80) also decreases in magnitude. In turn and for a constant user force, the translated force 104 is not as amplified in the full close position as in the full open position as provided in equation (1) below:

Torque or Mechanical Advantage 104=[Engagement Point Distance to First Pivot Connection]× [Force at Engagement Point] (1)

As such and in this example, the mechanical advantage provided at or near the full open position is of a relatively greater magnitude than the mechanical advantage provided at or near the full close position.

Based on the above, Applicant has determined that the curvature, C4, of the bearing surface 67 can be adjusted and tailored to fit or substantially fit a desired mechanical advantage curve or profile for a hand operated cutting tool. In this regard, adjustment of the curvature, C4, impacts where the engagement of the bearing surfaces 31, 67 occurs throughout the cutting stroke to affect the distance of this engagement point relative to the first pivot connection 80 (i.e., the moment arm). As a result, the mechanical advantage may be adjusted by modifying the curve to increase/decrease the distance between an engagement point at a particular location throughout the cutting stroke to, in turn, achieve or substantially achieved a desired mechanical advantage profile for the tool.

Figure 10:
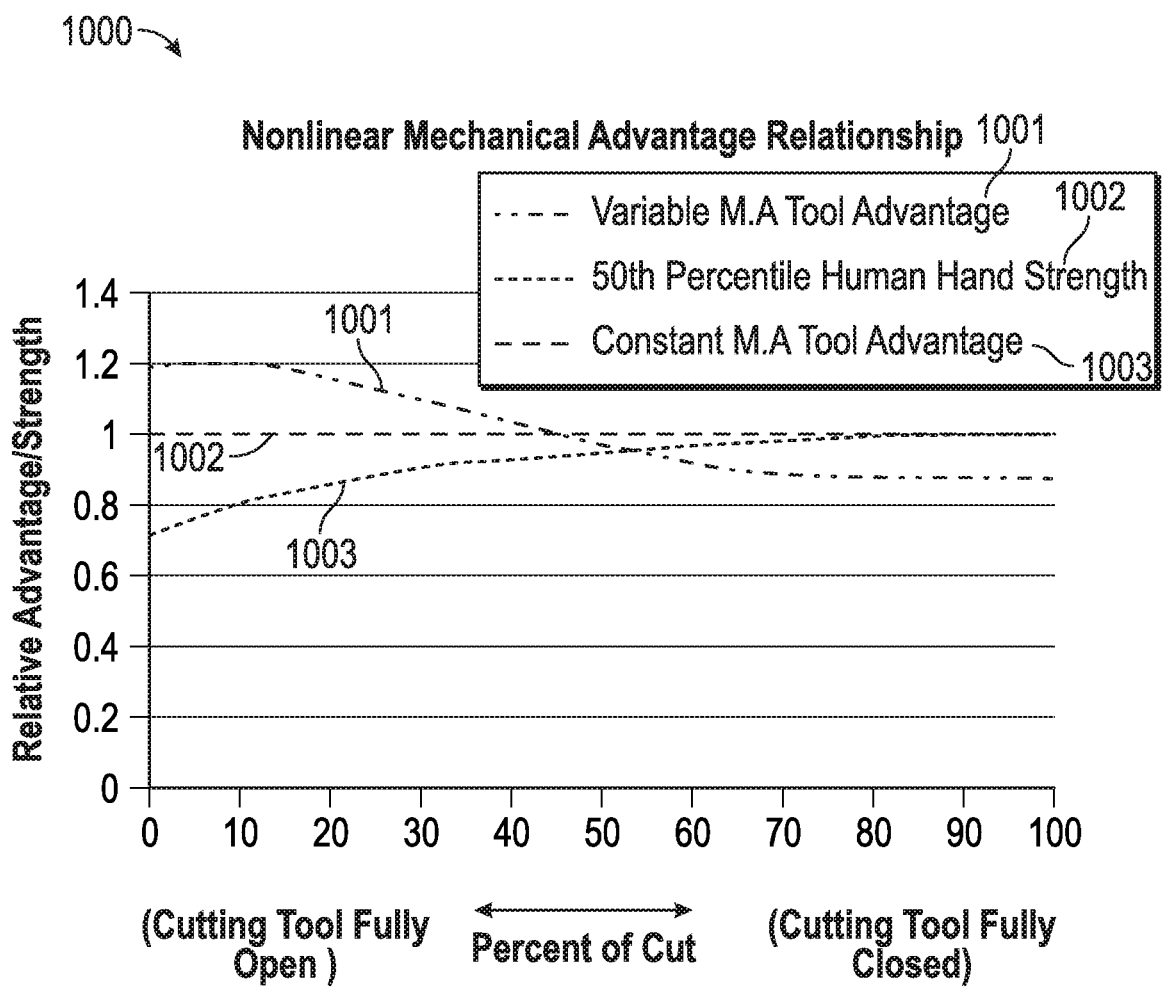
FIG. 10 is a graph of a variable mechanical advantage curve/profile for the one-hand operated cutting tool of FIGS. 1-2, according to an exemplary embodiment.

Referring now to FIG. 10, a graph of a mechanical advantage curve for the one-hand operated cutting tool of FIGS. 1-2 is depicted, according to an exemplary embodiment. Graph 1000 depicts a variable mechanical advantage curve 1001 provided by the variable mechanical advantage system 100 of the present disclosure relative to a human strength curve 1003 and a constant mechanical advantage curve 1003. As shown, the curves 1001, 1002, and 1003 are a function of handle angle/spacing (i.e., from the full open position to the full close position). The constant mechanical advantage curve 1003 represents the mechanical advantage provided by a simple pivot connection as used in conventional one-hand operated cutting tools, which is constant (i.e., not changing). The human strength curve 1002 represents fiftieth percentile experimental data showing the strength of a user as a function of handle angle during the cutting stroke. As shown, the human strength is at a minimum at the full open position and increases as the handles progress towards the full close position.

While the human strength curve 1002 indicates a minimum amount of human strength at or near the full open position, the variable mechanical advantage curve 1001 is at a maximum. This is due to the distance, D3, of the engagement of the bearing surfaces 31, 67 being at a maximum distance relative to the first pivot connection 80. As shown, the variable mechanical advantage curve 1001 is not constant and even decreases below the constant mechanical advantage curve 1002 at an intermediate position between the full open and full close position. However, at or near this intersection point of curves 1001 and 1002, the human strength curve 1003 is shown to increase to a maximum amount. At which point, not as much mechanical advantage may be needed because the user may be able to provide their maximum or near maximum amount of force to the tool. Thus, the variable mechanical advantage curve 1001 is at maximum at or near the full open position and transitions to a minimum at or near the full close position to coincide or match the human force characteristics. As a result, the user may experience an improved ease of use of the tool.

Of course, in other embodiments, Applicant may alter the variable mechanical advantage curve/profile to achieve various other desired mechanical advantage characteristics by altering the shape of the bearing surface 67 curvature, C4 (and, consequently, the remaining curvatures C1, C2, and C3). Nonetheless and as mentioned above, the pluralities of teeth 24, 61 selectively at least partially mesh or engage to prevent slippage of the bearing surfaces 31, 67, such that the user force 102, $F_u$, is substantially completely translated into the force 104, and not lost or dissipated into substantially unusable work. For example, due to the at least partial engagement of the teeth 24, 61, the handles 12, 14 are at least partially inhibited from moving back towards the full open position, which translates to the user's compression force being used substantially to cause the cutting stroke and not to overcome the force from the object that may push the handles 12, 14 towards the full open position as in conventional one-hand operated cutting tools. As a result, a user may utilize relatively less effort to actuate the tool yet achieve relatively greater cutting force. Such a configuration may minimize fatigue experienced by the user to prolong use.

Based on the foregoing, several characteristics of the hand-operated cutting tool with a variable mechanical advantage system are provided. As shown in FIGS. 8B, 8C, and 8E, the bearing surfaces 31, 67 remain engaged throughout the cutting stroke (i.e., in permanent engagement). Due to this engagement and that the bearing surface 67 extends at least partially beyond a top land of each of the plurality of teeth 61, relatively more force/load is transmitted by the engagement of the bearing surfaces 31, 67 than by the pluralities of teeth 24, 61. Further, the engagement of the bearing surfaces 31 and 67, the engagement of the pluralities of teeth 24 and 61, and the rotatable coupling of the first jaw 40 at the first pivot connection 80 causes rolling (via the bearing surfaces) and interlocking (via the pluralities of teeth) mechanisms to drive and rotate the first jaw 40 about the first pivot connection 80.

Figure 11:
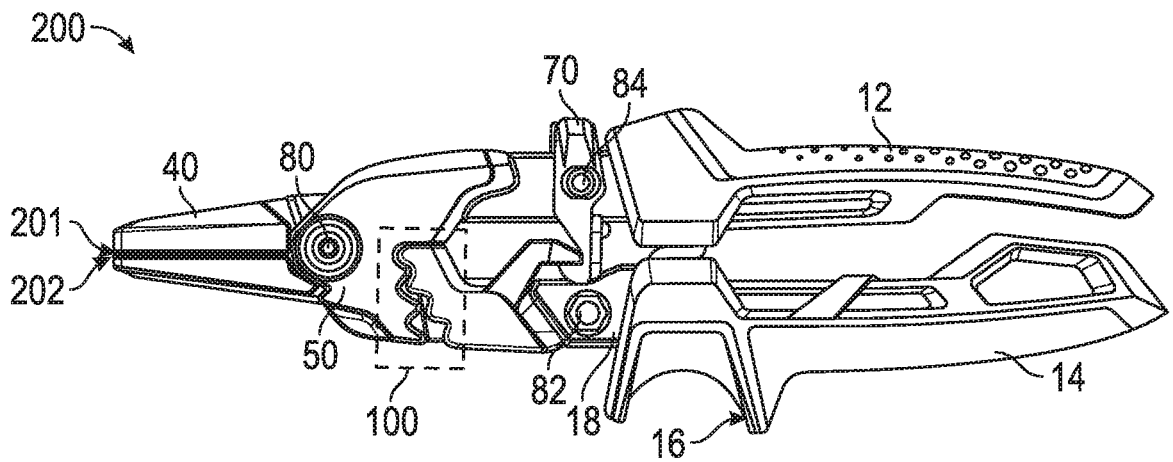
FIG. 11 is a front longitudinal view of a one-hand operated cutting tool, such as a seamer, in a fully closed and locked position, according to an exemplary embodiment.

Referring now to FIG. 11, a one-hand operated tool, shown as a seamer 1100, with a variable mechanical advantage system 100 is depicted according to an exemplary embodiment. Relative to the snip 10, the seamer 1100 includes the same or similar components, such that identical reference numbers are used to refer to similar components. However, the structure and function of the functional members 1101, 1102 of the seamer 1100 differ from that of the snip 10. In particular, the snip 10 includes first and second cutting members 43, 53 that are structured to cut, slice, or otherwise slice an object. However, the seamer 1100 includes a first functional member 1101 of the first jaw 40 and a second functional member 1102 of the second jaw 50. The first and second functional members 1101, 1102 include substantially horizontal or flat planar surfaces. In certain embodiments, a gripping surface/substrate (e.g., rubber sheet, etc.) may be applied or coupled to each one or both of the planar surfaces. The functional members 1101 and 1102 may be structured to clasp an object to impart bending or turning of that object. In particular, a user may squeeze each of the handles 12, 14 toward the full close position to apply a squeezing or compression force on the object of the seamer 1100. The user may then manipulate their hand to bend the object (e.g., sheet metal).

However and relative to the snip 10, the same or similar variable mechanical advantage system 100 may be used with the seamer 1100. In this regard, the variable mechanical advantage system may provide additional leverage or force when the seamer 1100 is at or near the full open position. Because this position typically corresponds with the user being able to provide the lowest amount of force, such a configuration facilitates the providing of relatively more force to the object than in typical one-hand operated tools.

It is important to note that the construction and arrangement of the elements of the hand operated cutting tool, shown as a snip, and hand operated tool, shown as a seamer, with a variable mechanical advantage system is illustrative only. Although only a few embodiments have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present disclosure possible (e.g., variations in sizes, dimensions, structures, shapes and proportions of the various elements, values of parameters, mounting arrangements, use of materials, colors, orientations, etc.). For example, the type and positions of the locking mechanisms (e.g., the lock lever) may be varied to accommodate changes in other components of the tool. Furthermore, the shape and appearance of the handles may be of any suitable size and shape. Thus, one of ordinary skill in the art will appreciate that many modifications, alterations, or changes may be imparted into the tools disclosed herein without departing from the spirit and scope of the present disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present disclosure as expressed in the appended claims.

What is claimed is:

1. A hand tool, comprising:
a first jaw having a first cutting member; and a second jaw having a second cutting member, the second jaw rotatably coupled to the first jaw by a first pivot connection, the second jaw including a first set of projections with spaces separating adjacent projections from each other, and a first bearing surface, the first bearing surface having a first curvature which substantially matches a pitch curvature of the first set of projections; and
a lever coupled to the first jaw, the lever including a second set of projections with spaces separating adjacent projections from each other, and a second bearing surface, the second bearing surface having a second curvature which matches the first curvature;
wherein the first and second jaws are movable between a full open position and a full close position, and wherein during a movement of the first and second jaws from the full open position to the full close position, the first and second sets of projections are at least partially engaged to prevent a slippage between the first and second bearing surfaces that are in at least partial contact throughout the movement of the first and second jaws from the full open position to the full close position.

2. The hand tool of claim 1, further comprising a support surface disposed between a pair of adjacent projections in the first set of projections.

3. The hand tool of claim 1, wherein the first bearing surface is positioned beyond a tip of a projection in the first set of projections such that at least a portion of the first bearing surface is positioned relatively further from the first pivot connection for the first and second jaws than the tip of the projection in the first set of projections.

4. The hand tool of claim 3, wherein the at least the portion of the first bearing surface extends relatively further away from the first pivot connection than a furthest extending tip in the first set of projections.

5. The hand tool of claim 4, wherein based on the at least the portion of the first bearing surface extending beyond the furthest extending tip in the first set of projections, a relatively greater amount of force is provided between the at least partial contact of the first and second bearing surfaces than from the at least partial engagement of the first and second sets of projections.

6. The hand tool of claim 1, wherein the first curvature is non-circular, and wherein the second curvature is equal and opposite to the non-circular first curvature.

7. The hand tool of claim 1, wherein the first and second bearing surfaces engage at a rolling contact engagement point, and wherein a distance between the rolling contact engagement point and the first pivot connection for the first and second jaws varies during the movement from the full open position to the full close position.

8. The hand tool of claim 7, wherein the distance is at a minimum in the full close position and at a maximum in the full open position.

9. The hand tool of claim 1, wherein said hand tool is a one-hand operated hand tool.

\* \* \* \* \*